United States Patent
Aritomi

(10) Patent No.: US 8,319,997 B2
(45) Date of Patent: Nov. 27, 2012

(54) INFORMATION PROCESSING APPARATUS TO DISPLAY INFORMATION ABOUT PROGRESS OF PRINT PROCESSING, INFORMATION PROCESSING METHOD, AND STORAGE MEDIUM

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 12/336,720

(22) Filed: Dec. 17, 2008

(65) Prior Publication Data
US 2009/0161157 A1    Jun. 25, 2009

(30) Foreign Application Priority Data
Dec. 21, 2007 (JP) ................ 2007-330952

(51) Int. Cl.
G06F 3/12 (2006.01)
G06F 3/048 (2006.01)
G03G 15/00 (2006.01)

(52) U.S. Cl. .......... 358/1.15; 399/81; 715/772
(58) Field of Classification Search ........ 358/1.15; 399/81; 715/772
See application file for complete search history.

(56) References Cited

U.S. PATENT DOCUMENTS

| | | | |
|---|---|---|---|
| 5,706,411 A * | 1/1998 | McCormick et al. | 358/1.14 |
| 6,268,924 B1 | 7/2001 | Koppolu | |
| 6,486,968 B2 * | 11/2002 | Nishikawa | 358/1.15 |
| 7,304,664 B2 * | 12/2007 | Kawade | 348/207.2 |
| 2003/0234957 A1 * | 12/2003 | Ohara | 358/1.15 |
| 2004/0003112 A1 | 1/2004 | Alles | |
| 2005/0052659 A1 * | 3/2005 | Jacobsen et al. | 358/1.1 |
| 2005/0141006 A1 * | 6/2005 | Aiyama | 358/1.13 |
| 2006/0156246 A1 | 7/2006 | Williams | |
| 2007/0201068 A1 * | 8/2007 | Matsuki | 358/1.13 |

FOREIGN PATENT DOCUMENTS

| | | |
|---|---|---|
| JP | 2004-38956 | 2/2004 |
| JP | 2006-195970 A1 | 7/2006 |

* cited by examiner

*Primary Examiner* — Twyler Haskins
*Assistant Examiner* — Fred Guillermety
(74) *Attorney, Agent, or Firm* — Canon U.S.A., Inc., IP Division

(57) ABSTRACT

An information processing apparatus displays printing progress information about a document that has been instructed to be printed by a user through an application. The information processing apparatus has a display unit configured to display the progress of print processing using information regarding the document structure and the number of pages of the document. The information processing apparatus also has an updating unit configured to update the displayed information in accordance with the progress of print processing of the document.

15 Claims, 28 Drawing Sheets

INFORMATION PROCESSING APPARATUS TO DISPLAY INFORMATION ABOUT PROGRESS OF PRINT PROCESSING, INFORMATION PROCESSING METHOD, AND STORAGE MEDIUM

BACKGROUND OF THE INVENTION

1. Field of the Invention

The present invention generally relates to an information processing apparatus, an information processing method, and a storage medium having computer executable-instructions for the method. For example, the present invention may generally relate to a process for displaying a processing progress of a printer performed by an information processing apparatus.

2. Description of the Related Art

When a user operates an information processing apparatus, such as a personal computer, to print a document created using the information processing apparatus, the user may receive print status information through a print dialog screen of an application.

An existing process using a GDI (graphic device interface) print path in the operating system (OS) Windows® is available from Microsoft corporation. In this process, an application displays a "Print" dialog box so as to inform a user that printing is in progress. The information displayed for the user includes:

(a) a file name (application-specific format),
(b) a target printer name, and
(b) the number of pages.

In addition, print data is spooled by a system spooler of the OS. When the user selects a target printer, a spool list is displayed by the system spooler. Thus, the user can monitor the printing status. The information sent from the system spooler includes:

(a) a job name (assigned by the application),
(b) a status, and
(c) the number of pages.

In this system, the print status is typically displayed before and after a print driver is called. In addition, since a printer driver in the GDI print path, such as a graphics driver for generating print data, is sequentially called by the GDI, it can be difficult for the user to recognize the print status.

However, this process has been changed by a printing system of the operating system Windows Vista®, also available from Microsoft corporation. This system has been expanded so that an XPS (XML paper specification) print path is supported in addition to the previous GDI print path. The operations of a system spooler for the GDI print path and the XPS print path are virtually the same as the previously existing operation of Windows®. However, the XPS print path also uses an XPS spool file. For data that is to be printed, this XPS format is maintained from submission performed by an application to the process of a print driver or a printer. The XPS format is an open electronic document format used for creating a cross platform document. The XPS format also serves as a spool file format. A file of an XPS format includes not only a document body but also print setting information called "PrintTicket". The PrintTicket information allows print settings, such as a print layout, to be maintained and cross referenced. For example, a banner setting "JobPrimaryBannerSheet" includes the following three parameters: "Standard" (a banner is attached by a printer), "Custom" (a page specified by an application functions as a banner), and "None" (no banner is attached). Thus, an application can relatively easily specify the setting, and other software can relatively easily recognize the setting. In addition, as described in Japanese Patent Laid-Open No. 2004-38956, in a graphics filter pipeline of a printer driver in an XPS print path, the print setting for the document can be referred to or manipulated. On the other hand, Japanese Patent Laid-Open No. 2006-195970 proposes a technique to display data in a format different from an ordinary file list by an information processing apparatus so that the data is focused on a particular file property.

In the existing methods, it can be difficult to display a print status for each of the documents being printed. Accordingly, further improvement is sought.

An application manages document files having a format specific to the application, and therefore, the lower-layer printing process may not be capable of referring to the information about the document files. In addition, although the user may be able to recognize that the printing process is proceeding, the user may not be able to obtain detailed information as to how many pages of the document have been printed.

Furthermore, the application (before spooling) and the system spooler (after spooling) may refer to different print information.

Still furthermore, when the layout or the number of pages is changed before and after spooling, such information typically cannot be readily shared. That is, it may be difficult for the application and the system spooler to share any of counting information in a rendering process, print settings of the application, and setting instructions from the application to one or more devices.

SUMMARY OF THE INVENTION

According to an embodiment of the present invention, an information processing apparatus configured to display information about a progress of print processing of a document which a user has instructed to be printed by using an application is provided. The information processing apparatus includes a display unit configured to display the progress of print processing using information regarding a document structure and the number of pages of the document, and an updating unit configured to update the displayed information in accordance with the progress of print processing of the document.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain principles of the invention.

DESCRIPTION OF THE EMBODIMENTS

Various exemplary embodiments in accordance with the present invention are described in detail below with reference to the accompanying drawings. The following descriptions are made with reference to a system including a computer and a printer. However, the present invention is not intended to be limited to such a system. A first exemplary embodiment is described as follows.

Configuration of Printing System

Figure 1:
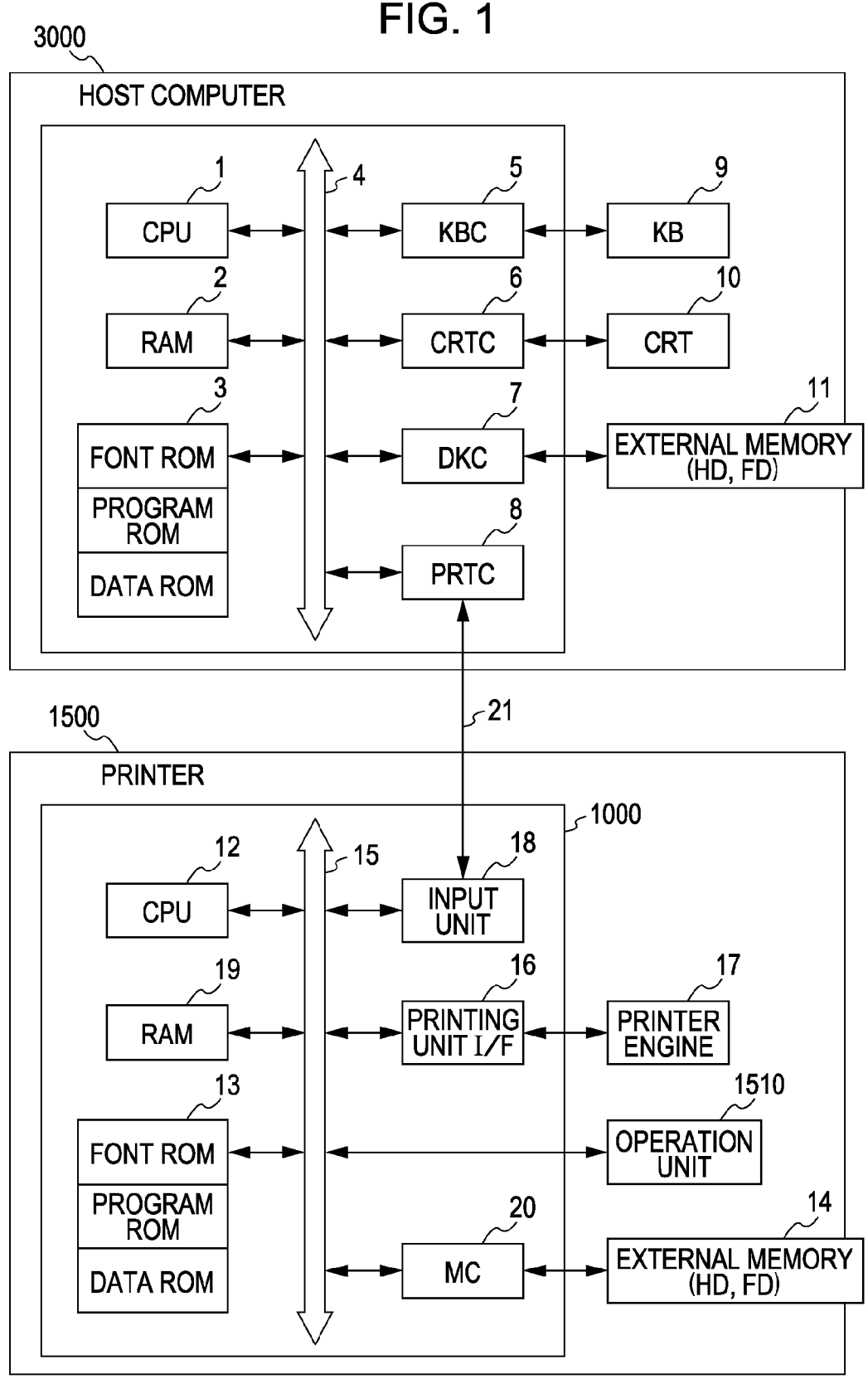
FIG. 1 is a block diagram illustrating an exemplary configuration of a printing system according to an embodiment of the present invention.

FIG. 1 is a block diagram illustrating an exemplary configuration of a printing system according to an embodiment of the present invention. The present invention may be applicable to any stand-alone apparatus, any plurality of apparatuses, and any system connected to a local area network (LAN) or a wide area network (WAN) that can realize the function of the present invention.

In the embodiment as shown in FIG. 1, a computer 3000 includes a central processing unit (CPU) 1 that controls execution of a printing process including various sub-processes according to embodiments of the present invention. The sub-processes are described below with reference to a document processing program stored in a program ROM area of a program read only memory (ROM) 3 or an external memory 11. The printing process may be performed on the basis of document processing of a document that may include, for example, one or more of a figure, an image, characters, and a table, such as for example a spreadsheet. The CPU 1 performs overall control of devices connected to a system bus 4. An operating system program (hereinafter simply referred to as an "OS") which is a control program of the CPU 1 is stored in the ROM 3 or the external memory 11. In addition, font data used when the document processing is performed may be stored in a font ROM area of the ROM 3 or the external memory 11. Furthermore, various data used when the document processing is performed may be stored in a data ROM area of the ROM 3 or the external memory 11. A random access memory (RAM) 2 functions as a main memory and a work area of the CPU 1.

A keyboard controller (KBC) 5 controls a key input operation input from a keyboard 9 and a pointing device (not shown). A CRT controller (CRTC) 6 controls the display of information on a CRT display (CRT) 10. The CRTC 6 may control the display of a copy-forgery-inhibition pattern as well. A disk controller (DKC) 7 controls access to an external memory 11. Examples of the external memory 11 may include, but are not limited to, a hard disk (HD) and a floppy (trade name) disk (FD), which may store a boot program, a variety of applications, font data, a user file, an editing file, and a printer control command generation program (hereinafter referred to as a "printer driver"). A printer controller (PRTC) 8 may be connected to a printer 1500 via a bi-directional interface (interface) 21. The PRTC 8 can perform control so as to communicate with the printer 1500.

The CPU 1 may open a variety of pre-registered windows on the basis of a command specified using a mouse cursor (not shown) displayed on the CRT 10. Thereafter, the CPU 1 may perform a variety of data processing tasks. When a user performs printing, the user can open a window related to print settings. Thereafter, the user can change printer settings and can set a print processing method for a printer driver including selection of a print mode.

In the embodiment as shown in FIG. 1, the printer 1500 includes a CPU 12. The operation of the printer 1500 may be controlled by the CPU 12. The printing unit 17 may be connected to a system bus 15 via a printing unit interface (I/F) 16. The CPU 12 may output an image signal serving as print output information to a printing unit (a printer engine) 17 on the basis of a control program stored in a read only memory (ROM) 13 or a control program stored in an external memory 14.

In addition, a program ROM area of the ROM 13 can store a control program of the CPU 12. A font ROM area of the ROM 13 may store font data used for generating the print output information. If a printer does not have the external memory 14, such as a hard disk, a data ROM area of the ROM 13 may store information used by a computer.

In the embodiment as shown in FIG. 1, the CPU 12 can communicate with a computer via an input unit 18. Thus, the CPU 12 can send information stored in the printer to the computer 3000. A RAM 19 may function as a main memory and a work area of the CPU 12. In addition, by connecting an optional RAM to an extension port (not shown), the memory capacity can be increased. Note that the RAM 19 may be used for an output information expanding area, an environment data storage area. A NVRAM (nonvolatile RAM) may be used for the RAM 19.

Accessing operation to the external memory 14, such as a hard disk (HD) or an IC card, may be controlled by a memory controller (MC) 20. The external memory 14 is optionally connected to the printer 1500. The external memory 14 may store at least one of font data, an emulation program, and form data. In addition, the input unit 18 can include switches and light-emitting diode (LED) illuminators disposed on an operation panel.

The printer 1500 may include an NVRAM (not shown) in order to store printer mode setting information set through an operation panel 1510.

According to the present embodiment, the printer engine 17 is an electrophotography engine. Accordingly, print data including a copy-forgery-inhibition image may be printed on a medium, such as a sheet of paper, using a toner dot pattern. It should be noted that the printing method used in accordance with the present invention is not limited to an electrophotography method. For example, the present invention may be applicable to a printer employing any method in which printing is performed by forming a dot pattern, such as an inkjet method.

Figure 2:
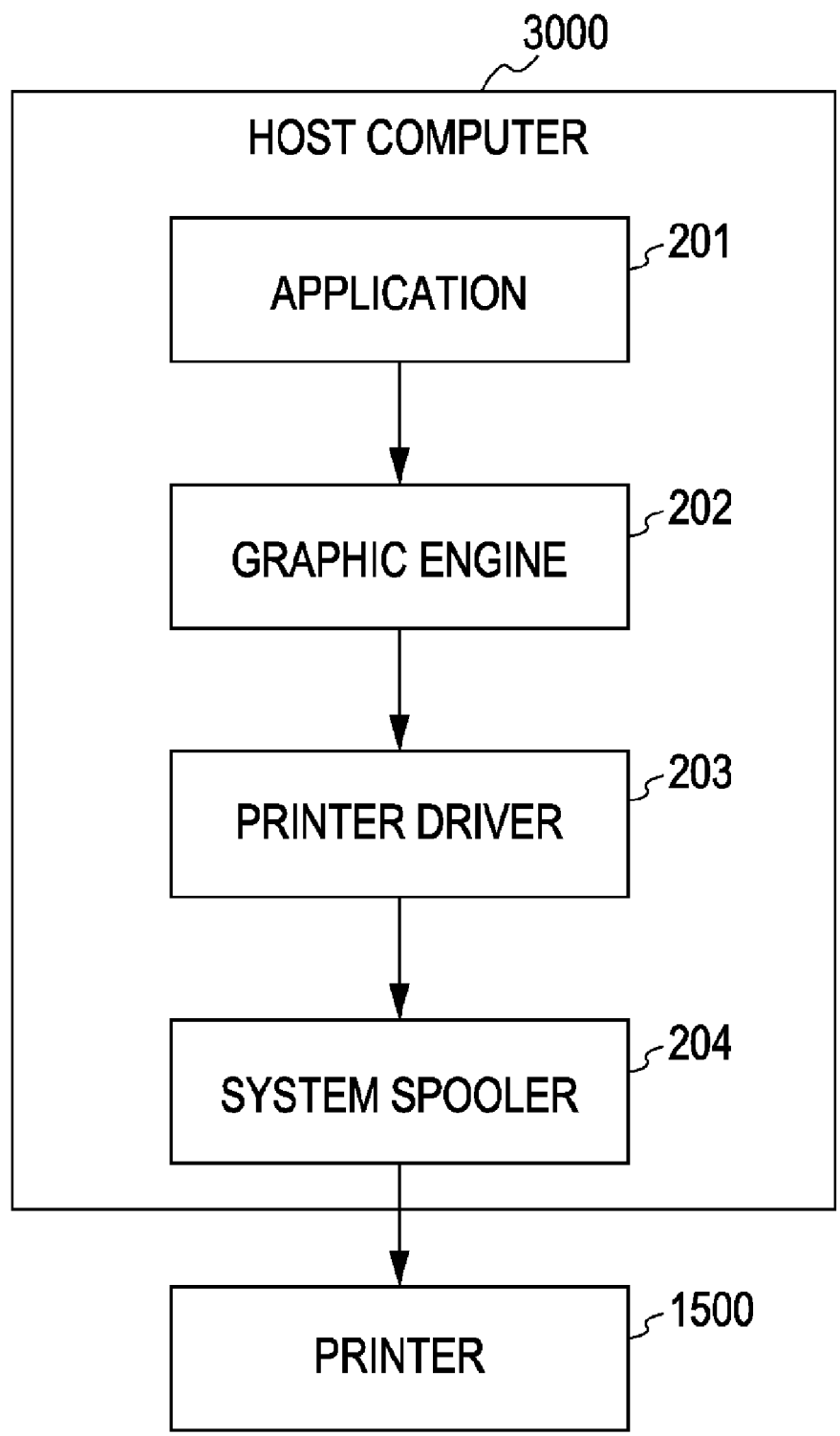
FIG. 2 illustrates an exemplary configuration of a host computer for performing print processing.

FIG. 2 illustrates an exemplary configuration of the computer 3000 shown in FIG. 1 for performing print processing. The configuration includes an application 201, a graphic engine 202, a printer driver 203, and a system spooler 204, which may be in the form of files stored in the external memory 11. These files are loaded onto a RAM 2 by the OS or a module using an OS module. Subsequently, the files function as program modules to be started by the OS or the module.

The application 201 and the printer driver 203 can be added to the external memory (HD) 11 via the external memory (FD) 11, a CD-ROM (not shown), or a network (not shown). The application 201 stored in the external memory 11 may be loaded into the RAM 2 and executed. However, when the application 201 outputs (renders) print data and instructs the printer 1500 to perform a printing operation, the graphic engine 202 loaded into the RAM 2 and being executable in a similar manner may be used. The graphic engine 202 loads the printer driver 203 prepared for each of printers from the external memory 11 into the RAM 2. The graphic engine 202 sets a setting so that the output of the application 201 is routed to the printer driver 203.

The GDI print path of Windows® is described next. The graphic engine 202 receives a GDI (graphic device interface) function from the application 201 and converts the received GDI function to a DDI (device driver interface) function. The graphic engine 202 then outputs the DDI function to the printer driver 203. The printer driver 203 converts the DDI function received from the graphic engine 202 into a control command recognizable by a printer (e.g., a PDL (print description language) command). The converted printer control command is output to the printer 1500 in the form of print data via the system spooler 204 and the interface 21. Note that the system spooler 204 is loaded into the RAM 2 by the OS.

In contrast, the basic configuration of a GDI print path of Windows Vista® is the same as that of Windows®. However, a new XPS print path is added. In this configuration, the graphic engine 202 receives a common document from the application 201 and outputs the received document to the printer driver 203. Upon receiving the common document from the graphic engine 202, the printer driver 203 converts the common document into a control command recognizable by a printer (e.g., a PDL command). The converted printer control command is output to the printer 1500 in the form of print data via the system spooler 204 and the interface 21. Note that the system spooler 204 is loaded into the RAM 2 by the OS. If the printer is designed so as to be capable of recognizing a common document, the common document may be output without being converted.

Figure 3:
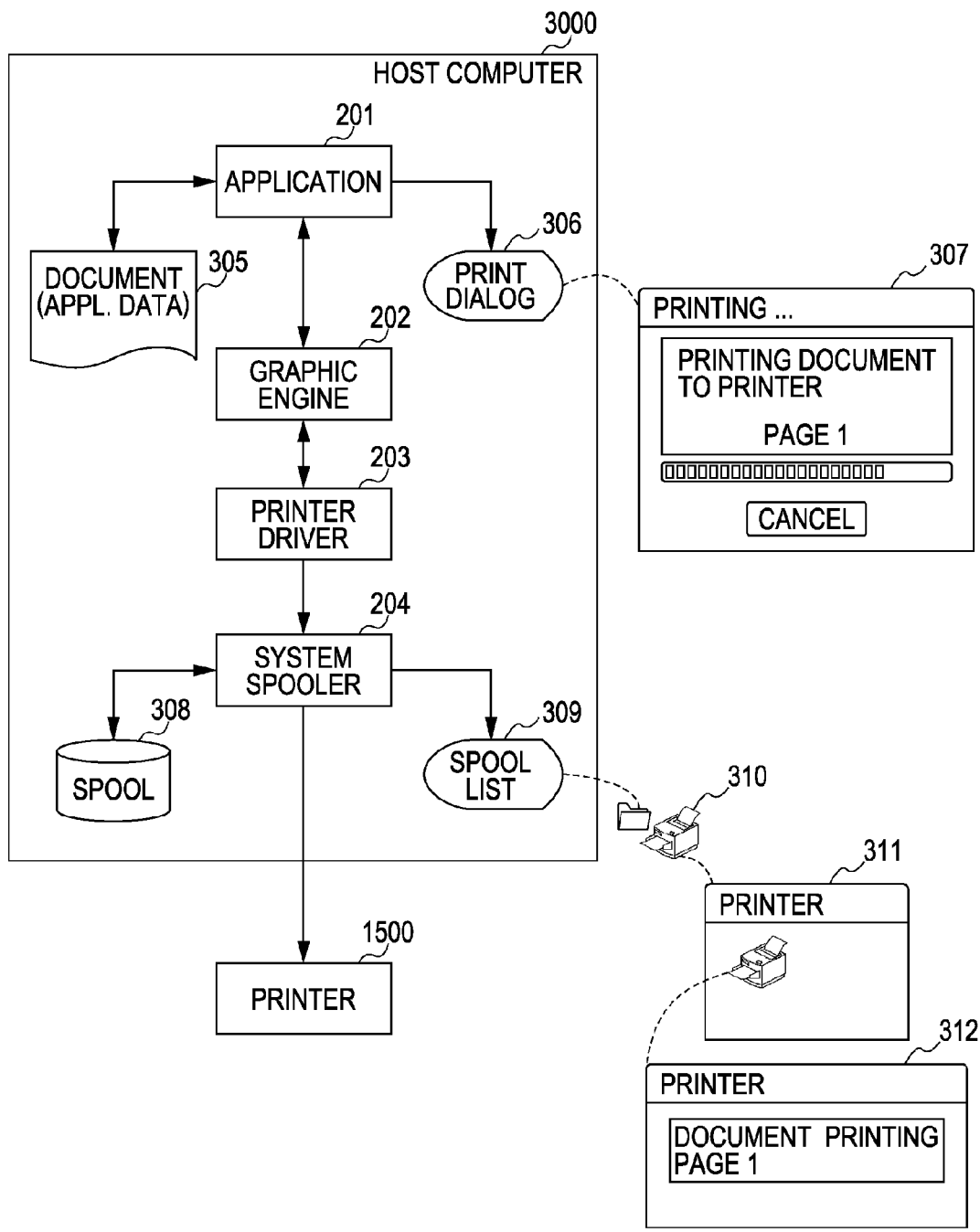
FIG. 3 illustrates an embodiment of a GDI print path.

FIG. 3 illustrates an example of a GDI print path.

In the example shown in FIG. 3, the application 201 has a document 305 having a format specific to the application 201. The document 305 is printed from the application 201. The application 201 processes the document 305 and starts the graphic engine 202. The processing progress is displayed in a print dialog 306 by the application 201. A particular example of the print dialog 306 is a "Print" dialog 307. A page number of the document 305 is displayed to indicate the processing progress. Print data generated by the printer driver 203 in accordance with the processing of the application 201 is delivered to a spool 308 by the system spooler 204. The system spooler 204 displays the state of the spool 308 in the form of a spool list 309. The spool list 309 can be viewed in a "printer" screen 312. The "printer" screen 312 is displayed by opening a printer folder 310 and opening the target printer in a printer list 311. In the case shown in FIG. 3, it may be difficult for the printer driver 203 to display a printing status, since the printer driver 203 cannot refer to the document 305. Accordingly, the application 201 and the system spooler 204 that can refer to the data display the printing status.

Outline of Configuration

Figure 4:
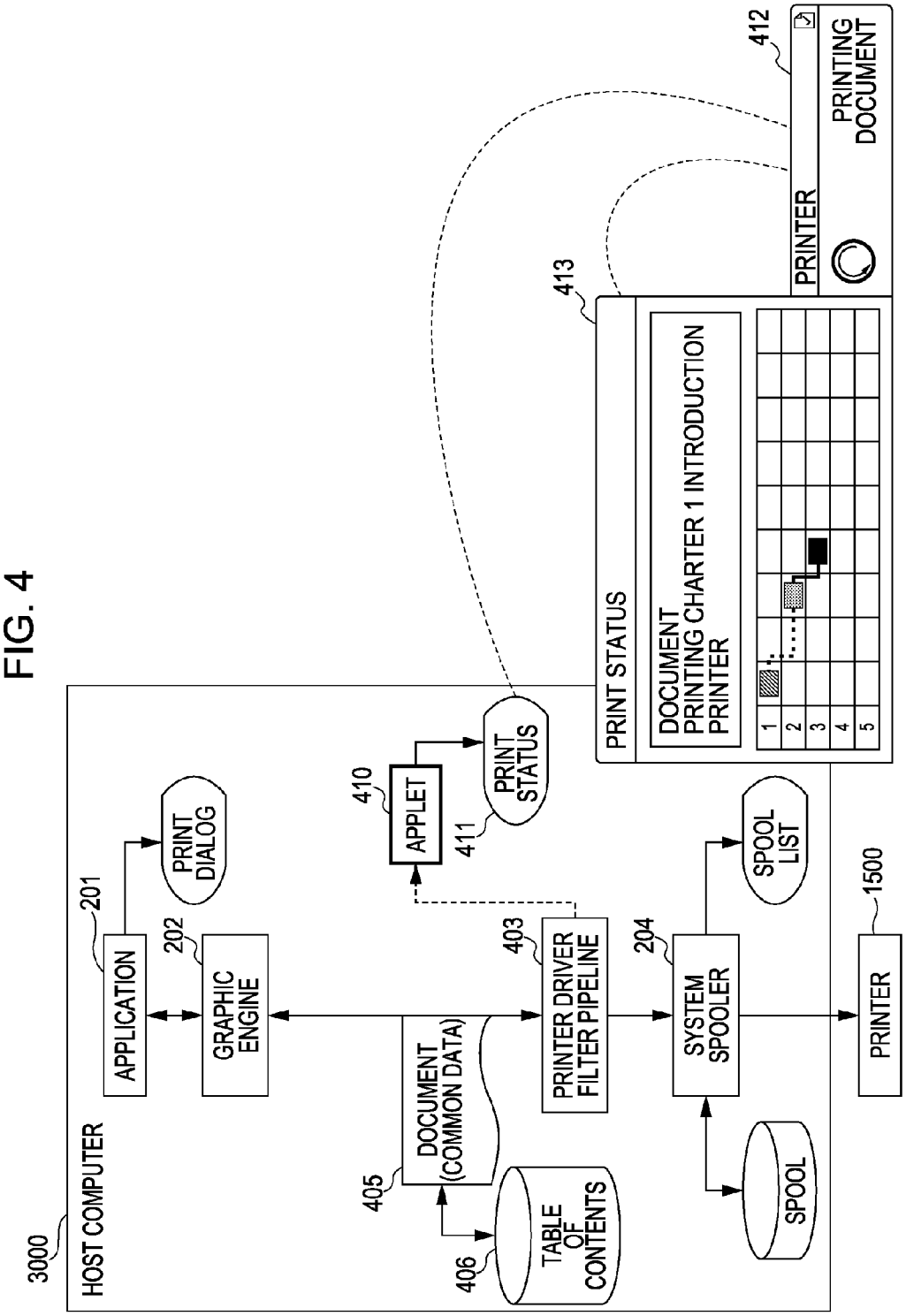
FIG. 4 is a schematic illustration of an embodiment of a system in an XPS print path.

FIG. 4 is a schematic illustration of an example of a system according to the present embodiment having an XPS print path.

In the embodiment shown in FIG. 4, a document is printed from the application 201. The application 201 starts the graphic engine 202. The result of execution of the graphic engine 202 is delivered to a filter pipeline of a printer driver 403 in the form of a document (common data) 405. An applet 410 displays the operation states of the printer driver 403 and the printer 1500 as a printing status 411. For example, the printing status 411 is first displayed by displaying an overview using a message and an icon, as shown in a standard window 412. When the standard window 412 is clicked, an extension window 413 is displayed. The extension window 413 includes detailed printing status represented by a message and a graph. The display information displayed through a function of the applet can include the document 405 and information about the table of contents 406 of the document 405. Since the printer driver 403 and the applet 410 can refer to the document 405, the printer driver 403 and the applet 410 can display the printing status.

The outline of an exemplary system configuration according to an embodiment of the present invention is described next with reference to FIG. 5.

Figure 5:
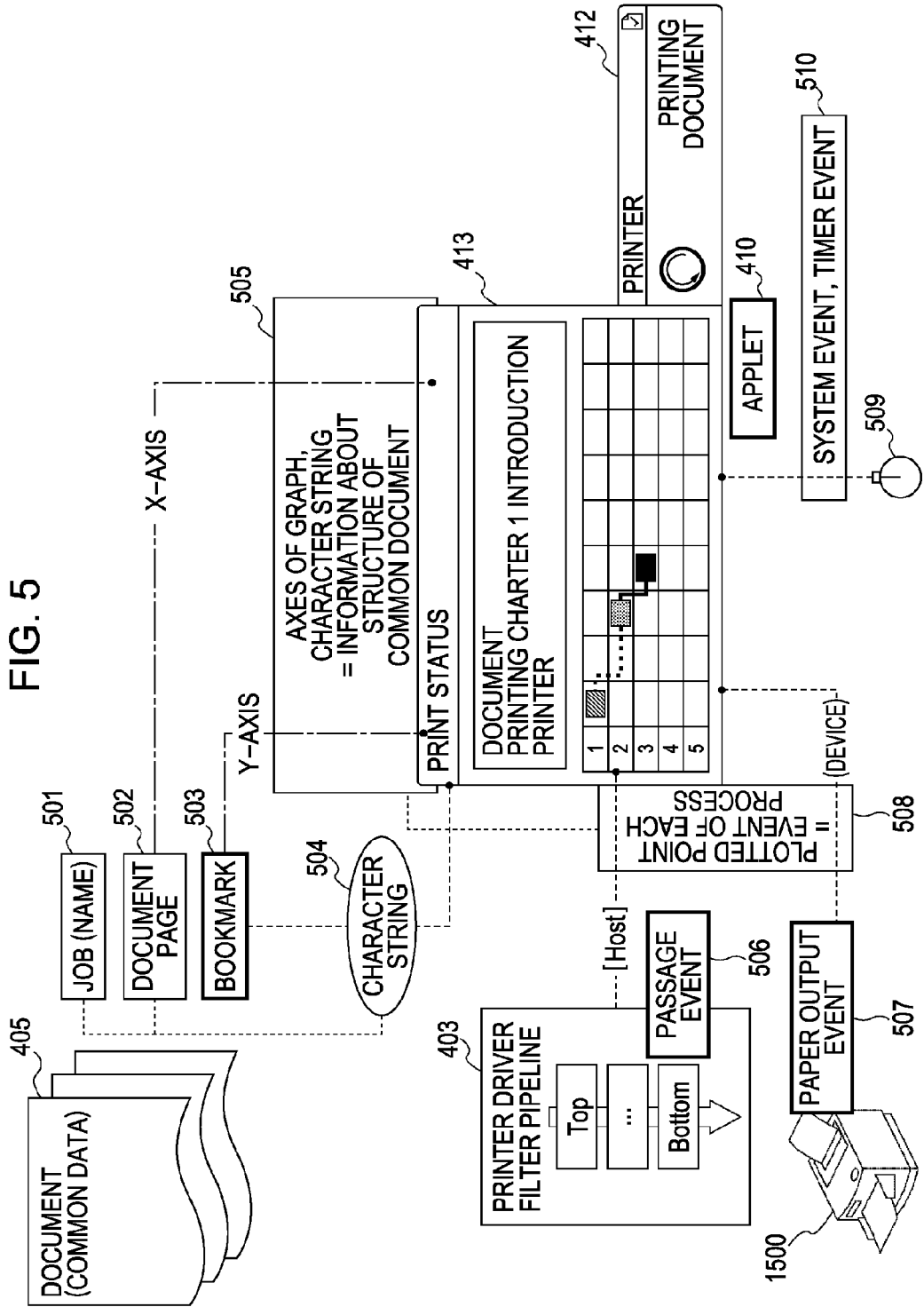
FIG. 5 illustrates the outline of an exemplary system configuration of the system.

In the embodiment as shown in FIG. 5, the applet 410 includes the standard window 412 and the extension window 413. The display of the applet 410 is generated using information 505 acquired from the common document 405 and the print path, an event 508 of each of the printing processes, and an event 510 of the OS and a timer 509. The applet 410 is running at all times as a service. Alternatively, the applet 410 may be started and terminated in response to an event from the printer driver 403 or the event 510 from the OS and the timer 509.

The information 505 acquired from the common document 405 and the print path may include at least one of a job name 501, a document page structure 502, bookmark information (document structure information) 503, and character strings 504 representing such information. The information 505 including such pieces of information is input to the applet 410. The information 505 is then processed so that display characters and an X-axis and a Y-axis of the processing progress graph are output. Examples of the event 508 of each of printing processes include a passage event 506 of the common document 405 output from the filter pipeline of the printer driver 403 and a paper output event 507 of the printer 1500. The event 508 is input to the applet 410. These events of a host computer and devices are processed so that the status is changed or a plotted point in the processing progress graph is output. The event 510 is triggered by the OS and the timer 509 of the system. The event 510 is processed so as to be used as a reference of the processing progress to be output. The input and output processing is described below.

Accordingly, the applet 410 uses the information 505 acquired from the common document 405 and the print path for displaying information and the axes of a graph. In addition, the applet 410 updates the display by manipulating the event 508 of each of printing processes using the event 510 received from the OS and the timer as a reference.

Input Sub-System of System

Figure 6:
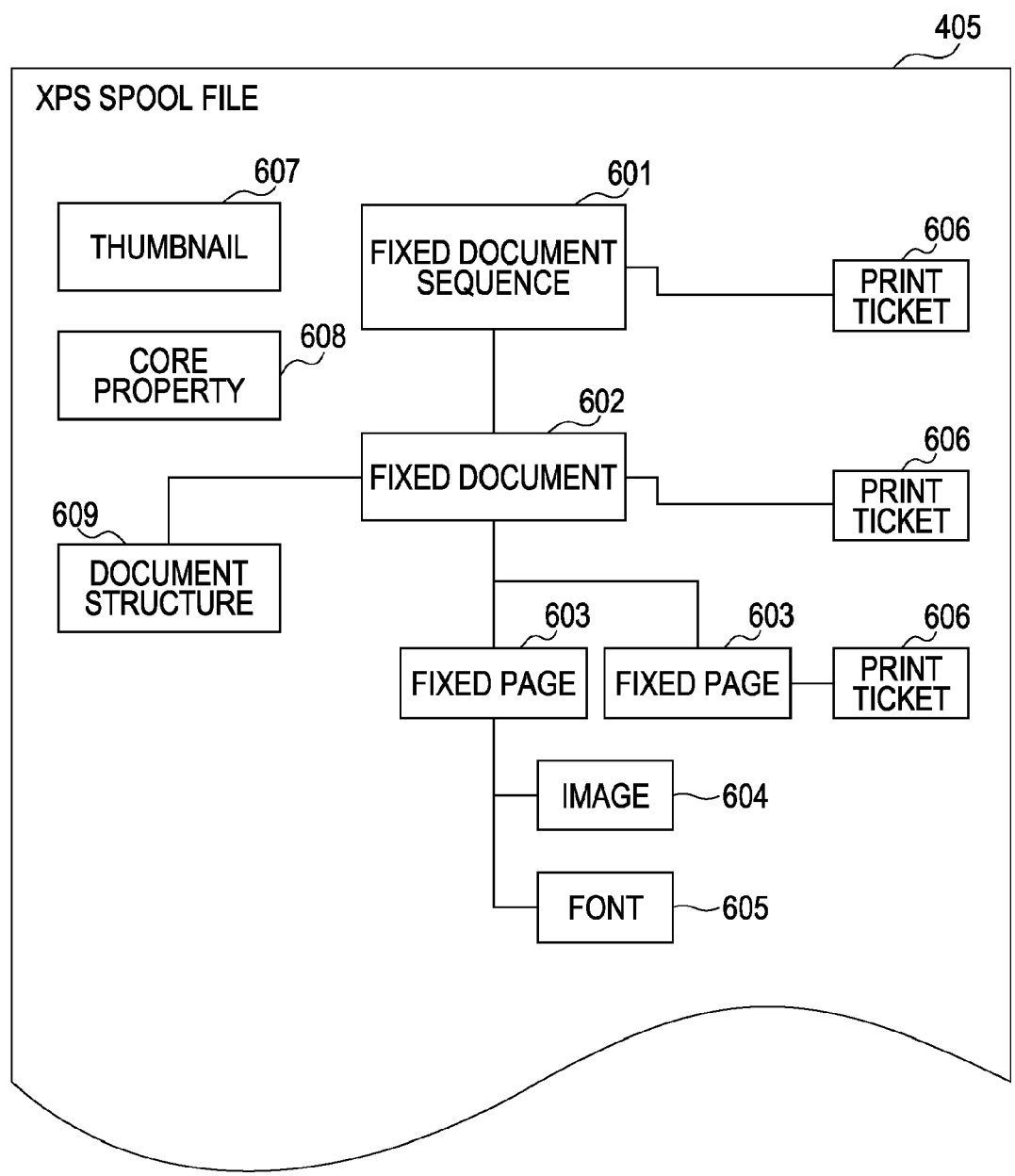
FIG. 6 illustrates an embodiment of the structure of an XPS spool file.

An embodiment of the structure of an XPS spool file representing the common document 405 is described next with reference to FIG. 6. The common document (the XPS spool file) 405 has a three-layer structure. The first layer includes Fixed Document Sequence 601 (hereinafter referred to as a "job"). The second layer includes Fixed Document 602 (hereinafter referred to as a "document"). The lowermost layer includes Fixed Page 603 (hereinafter referred to as a "page"). The XPS spool file 405 is a set of XML files in three layers. Each layer is also referred to as a "level". Each of the pages of a document, which is rendering data, is disposed at a page level. A plurality of pages are located at a document level. An XPS spool file 405 can include a plurality of documents. Accordingly, a job manages a plurality of documents. Such data may be written using XML. However, binary data, such as resource data, may be contained in XPS spool file 405 without any modification in the form of, for example, an image 604 and a font 605. PrintTicket 606 representing print settings can be provided for each of a job level, a document level, and a page level. Thus, print settings can be changed for each of the pages. In addition, each of the print settings in the PrintTicket 606 indicates the level to which the print setting is applied. This is indicated by using the prefix of a function name. For example, if a prefix "job" is attached, the print setting is applied to a job level. The PrintTicket 606 indicates the features of a printer and a printer driver using a tag "Feature" and indicates the options of the feature using a tag "Option". ScoredProperty and Property indicate property information associated with the Option. ParameterInit indicates the value of the feature. A thumbnail 607 is a snapshot image file of a first page. The page can be viewed by using this image without rendering the page. Accordingly, this page is useful when a plurality of XPS spool files 405 are displayed in a list format. A core property 608 includes property information about a document. Examples of the property information include a document name, a revision, and information about an editor. Document Structure 609 indicates information at a document level. In Document Structure 609, information about a document structure based on breaks in the document, such as chapters, is described. These data items are compressed into a file. In this way, the XPS spool file 405 may be generated.

Figure 7:
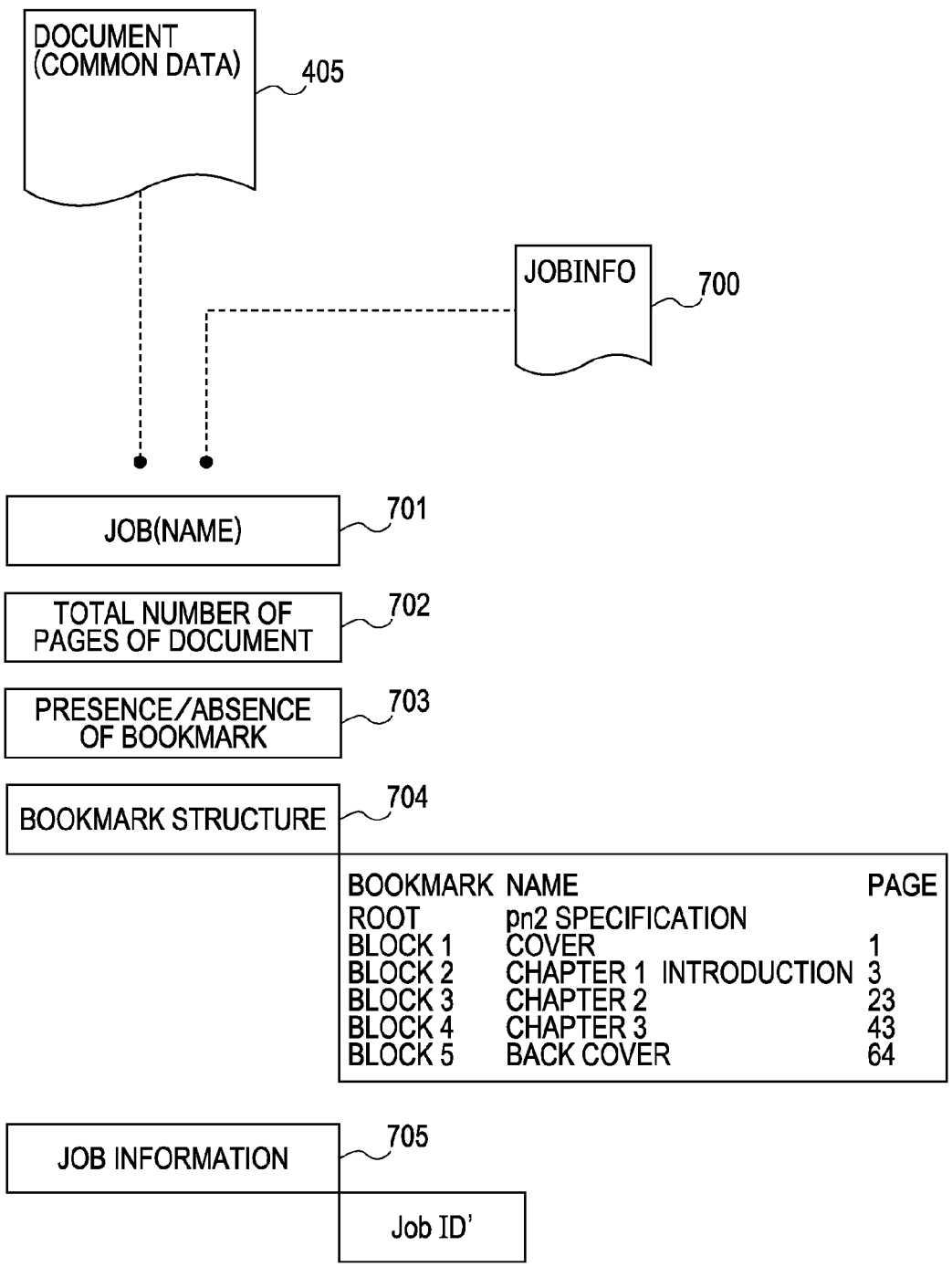
FIG. 7 illustrates an embodiment of input processing of information from a print path to the system.

An embodiment of processing of the common document 405 and information acquired from a print path is described next with reference to FIG. 7.

The applet 410 acquires a job (name) 701, the total number of pages 702, the presence and/or absence of a bookmark 703, and a bookmark structure (a document structure) 704 from JOBINFO 700 of the common document 405 and the XPS print path. The job (name) 701 is acquired from JOBINFO 700. The total number of pages 702 is obtained by counting the pages of the common document 405.

As used herein, the term "bookmark" refers to the table of contents 406. The bookmark is written in the above-described Document Structure. The bookmark information (the document structure) is represented by a tree structure. For example, the title of each chapter of the document can be used for a value (a name) set for each node. The presence of a bookmark 703 indicates whether a "Document Structure Outline" tag is present or not. If bookmark information is not present, it follows that a bookmark is not present. Note that if a name is assigned to a root of the bookmark structure 704, the name can be used for the job (name) 701. In addition, in order to identify a job, job information 705 is acquired from the JOBINFO 700. Another JobID' is generated from a system JobID, and the generated JobID' is written to the common document 405 as a private tag. These pieces of information are acquired from a system event by the applet 410 or are delivered from a downstream printing process including the filter pipeline of the printer driver 403 to the applet 410.

An embodiment of the "bookmark" is further described with reference to FIG. 8. In many cases, a viewer 801 for a common document is provided by the system. When a document 805 is opened using the viewer 801, an outline 809 is displayed. The outline 809 indicates the structure of "bookmarks".

An embodiment of the processing of information (an event) from the filter pipeline of the printer driver 403 is described next with reference to FIG. 9. By processing an event as described below, the display of the printing progress or the display of the processing status can be updated.

An event handler 900 of the applet 410 performs event registration 920 and event deletion 930 to a filter pipeline of the printer driver 403. The filter pipeline of the printer driver 403 submits an event when an event to be registered to the event handler 900 occurs. Examples of the submitted event may include, but are not limited to, at least one of a job start event 901, a job end event 910, a page processing start event, a page processing end event of TOP and BOTTOM filters of a multi-stage filter (902, 903, 904, and 905), and a physical page break event 906. Each of these events may include page identification information used for identifying page data of which page of the document is to be processed in response to the event. Examples of the submitted event may further include, for example, a document break event 907, a cancel event 908, and an error event 909. The physical page break (page progress) event 906 may be submitted when a physical page is advanced. When the page progress is changed, page change data may be attached to the event. For example, when the layout is changed to two-up, the page change data is "2". The filter pipeline of the printer driver 403 informs the event handler 900 of two-page progress. If the page change data is set to "0", the page progress is stopped.

An embodiment of the processing of information (an event) received from the printer 1500 is described next with reference to FIG. 10. When the events described below are processed, the display of the printing progress or the display of the processing status may be updated.

Figure 9:
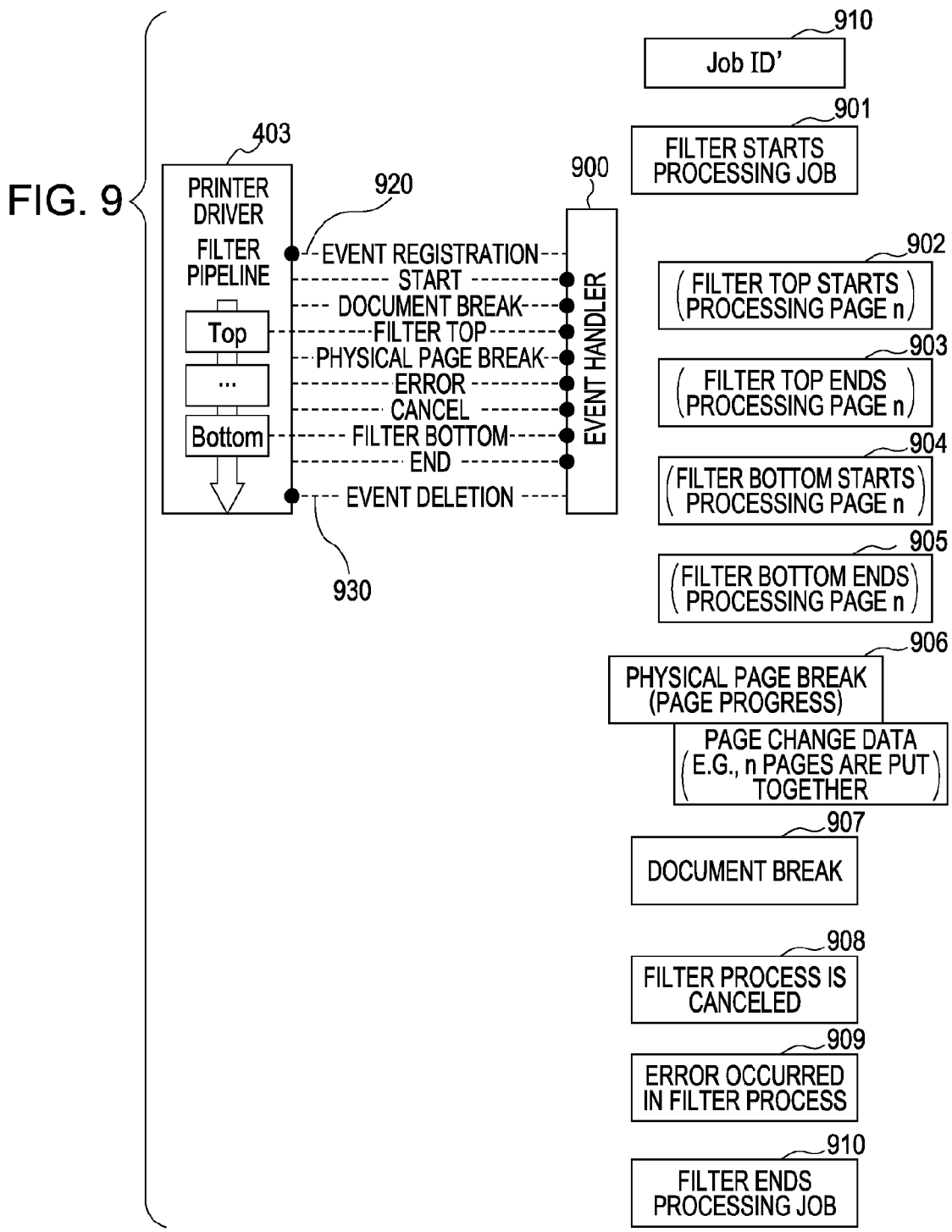
FIG. 9 illustrates an embodiment of input processing of information from a filter of the system.

The processing in this embodiment is similar to that of the filter pipeline of the printer driver 403 shown in FIG. 9. An event handler 1000 of the applet 410 performs event registration 1020 and event deletion 1030 to the printer 1500. The printer 1500 submits an event when an event to be registered to the event handler 1000 occurs. Examples of the submitted event may include, but are not limited to, at least one of a job start event 1001, a job termination event 1006, a physical page break event 1002, a document break event 1003, a cancel event 1004, and an error event 1005. Although not shown in FIG. 10, the page processing start and end events may be processed in a similar way to that shown in FIG. 9.

Figure 11:
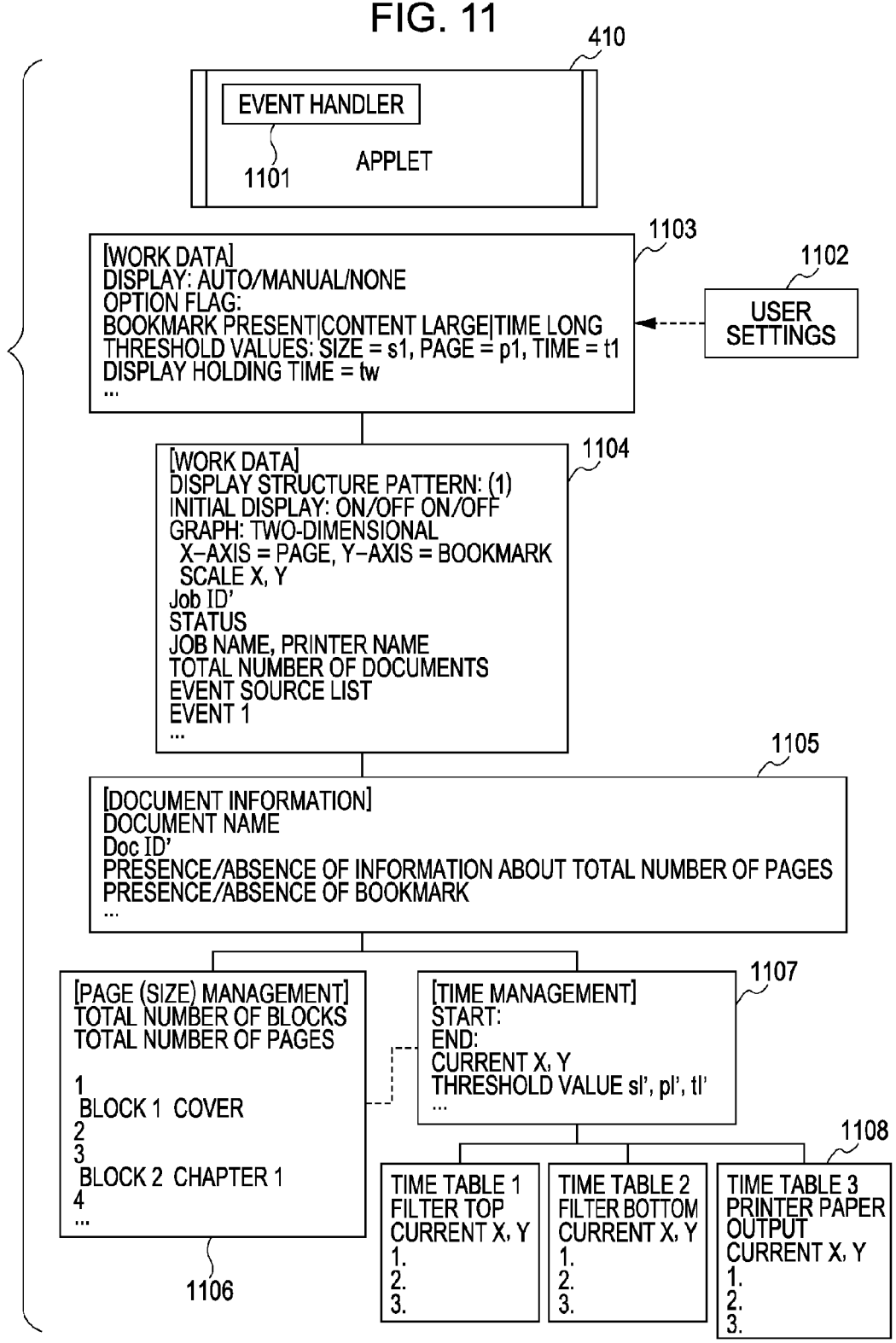
FIG. 11 illustrates an example of an applet of the system and the data structure thereof.

An embodiment of operation data of the applet 410 is described next with reference to FIG. 11.

Figure 8:
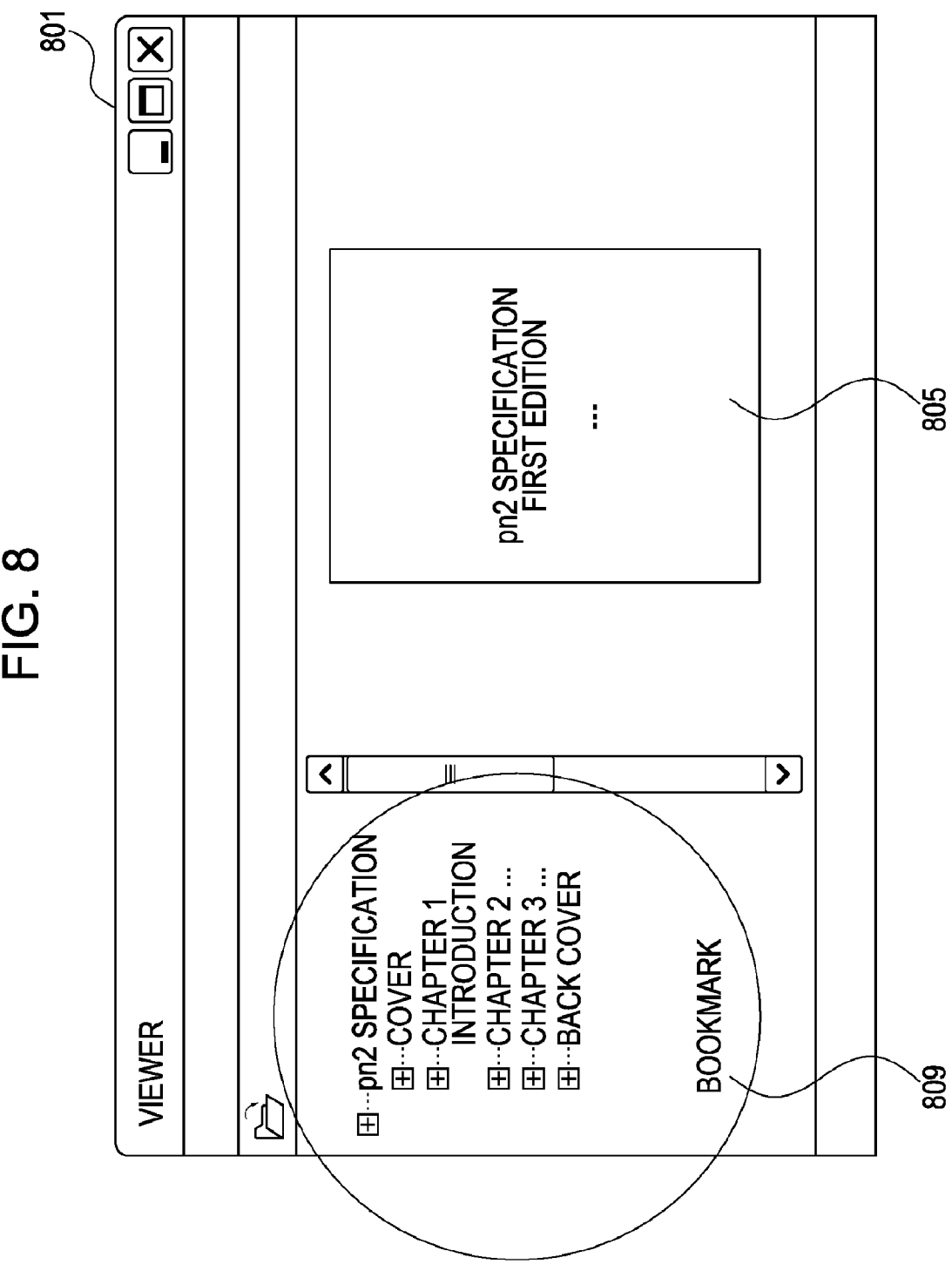
FIG. 8 illustrates an embodiment of a bookmark.
Figure 10:
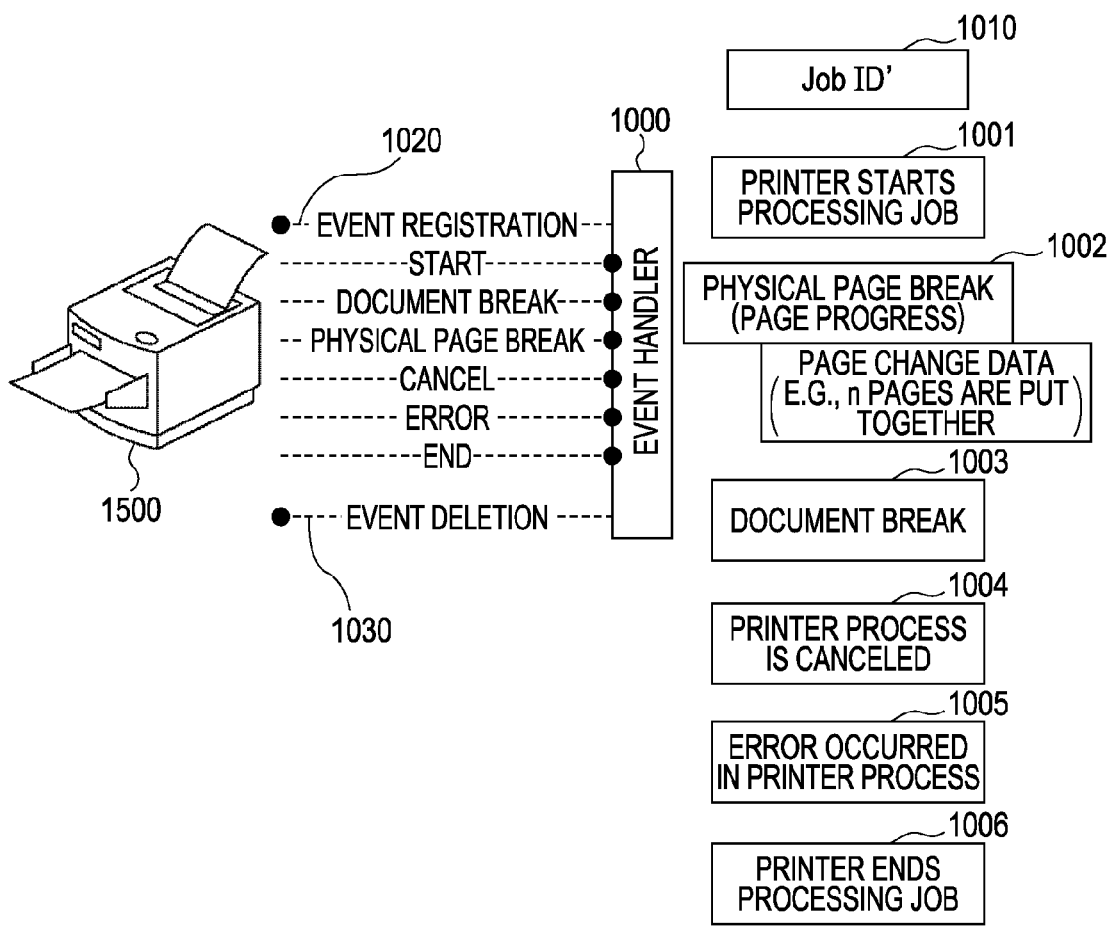
FIG. 10 illustrates an embodiment of input processing of information from a printer of the system.

In this embodiment, the applet 410 performs information processing similar to that described in FIGS. 8 to 10. The applet 410 includes an event handler 1101. The applet 410 generates work data 1103 in order to continue the processing thereof. The work data 1103 includes user settings. The work data 1103 has job information 1104 and document information 1105 in the lower layers thereof. The data illustrated in FIG. 7 may be contained in the job information 1104. The document information 1105 has a page management table 1106 for associating a page with a time, a time management table 1107, and a time table 1108 for each of event sources in the lower layers thereof. This layer structure starting from the job information 1104 is generated for each job.

An embodiment of input of the applet 410 has been described above. An embodiment of method for generating the display of the processing progress, which is the output of the applet 410, is described below.

Output Sub-System (Display Structure) of System

The basic concept of an embodiment of the display structure of the processing progress of the applet 410 is described next with reference to FIG. 12.

In this embodiment, the applet 410 determines the display structure using the following three conditions: the presence/absence 1201 of information regarding the total number of pages of the document, the presence/absence 1202 of the paper sheet output event of the printer 1500, and the presence/absence 1203 of information about a bookmark structure of a common document. In the present embodiment, the number of patterns of the display structure is eight. The presence/absence 1203 of information about a bookmark structure of a common document is shown across a pattern area surrounded by a rectangle.

According to this embodiment, the pieces of progress information provided from the applet 410 to a user are different in accordance with areas (1) to (8). In the area (1), information about the total number of pages, an output sheet, and a bookmark is provided. Thus, the largest amount of information is provided. However, in the area (8), the information about the total number of pages, an output sheet, and a bookmark is not provided. Thus, the smallest amount of information is provided. Accordingly, the area (1) represents the conditions provided from the applet 410 to the user that may be the most desirable conditions. Hereinafter, the areas (groups) (1) to (8) are referred to as "display structure patterns".

An embodiment of control of the display of messages performed by the applet 410 is described next with reference to FIG. 13.

In this embodiment, a display structure 1301 of a message provided by the applet 410 includes a job name field, a document name field, a bookmark name field, a status field, a counter field, a printer name field, and a comment field.

The printer name field in the third row according to this embodiment displays only acquired static information and does not display information changed in accordance with the processing progress.

For simplicity, the job name and the comment may not be shown.

The display in the document name field in the first row in this embodiment is updated during job processing if the job has a plurality of documents.

The second row according to this embodiment includes a bookmark name field, a status field, and a counter field, the display of which may be updated during job processing. The display/non-display of the bookmark name field is switched in accordance with the presence/absence condition 1203 of a bookmark. For example, if the bookmark structure 704 is present, a character string may be displayed in the bookmark name field. The display in the status field may be changed in accordance with the presence/absence condition 1202 of the paper sheet output event. For example, if the presence/absence condition 1202 condition indicates the presence of the paper sheet output event, a character string "printing" may be displayed. However, if the presence/absence condition 1202 indicates the absence of the paper sheet output event, a character string "processing" may be displayed. The display in the counter field may be changed in accordance with the presence/absence condition 1201 of the total number of pages of the document. For example, if the presence/absence condition 1201 indicates the presence of information regarding the total number of pages of the document, the information indicating "the current page number/the total number of pages" may be directly displayed, or the percentage ratio may be displayed. However, if the presence/absence condition 1201 indicates the absence of the total number of pages of the document, the current page number may be displayed. In one version, when the bookmark name is displayed, the counter may not be displayed.

An example of a relationship between a particular example of a display structure generated from the display structure 1301, and the display structure pattern, is illustrated using display structures 1302 to 1308.

The display structure 1302 is an example of that generated when the presence/absence condition 1203 indicates the presence of information about a bookmark structure of a common document, and the presence/absence condition 1202 indicates the presence of the paper sheet output event. According to this example, in the bookmark name field, "Chapter 1 Introduction" is displayed. In the status field, "Printing" is displayed. The counter field is not displayed. The display structure 1302 corresponds to the display structure pattern (1) or (5).

The display structure 1308 is an example in which the counter is displayed in the display pattern (1).

The display structure 1303 is an example of that generated when the bookmark field is not displayed because the presence/absence 1203 condition indicates the absence of the information about a bookmark structure of a common document, and the counter field displays "the current page number/the total number of pages" because the presence/absence condition 1202 indicates the presence of the paper sheet output event. The display structure 1303 corresponds to the display structure pattern (3).

The display structure 1304 is an example of that generated when the status field displays "Processing" because the presence/absence condition 1202 indicates the absence of the paper sheet output event even though the presence/absence condition 1203 indicates the presence of the information about a bookmark structure of a common document. The display structure 1304 corresponds to the display structure pattern (2) or (6). The display structures 1305, 1306, and 1307 are examples of those generated in a similar manner. The display structures 1305, 1306, and the structure 1307 correspond to the display structure patterns (4), (7), and (8), respectively.

In this way, the message display operations may be performed by the applet 410 on the basis of the above-described concept of a display operation.

Figure 14:
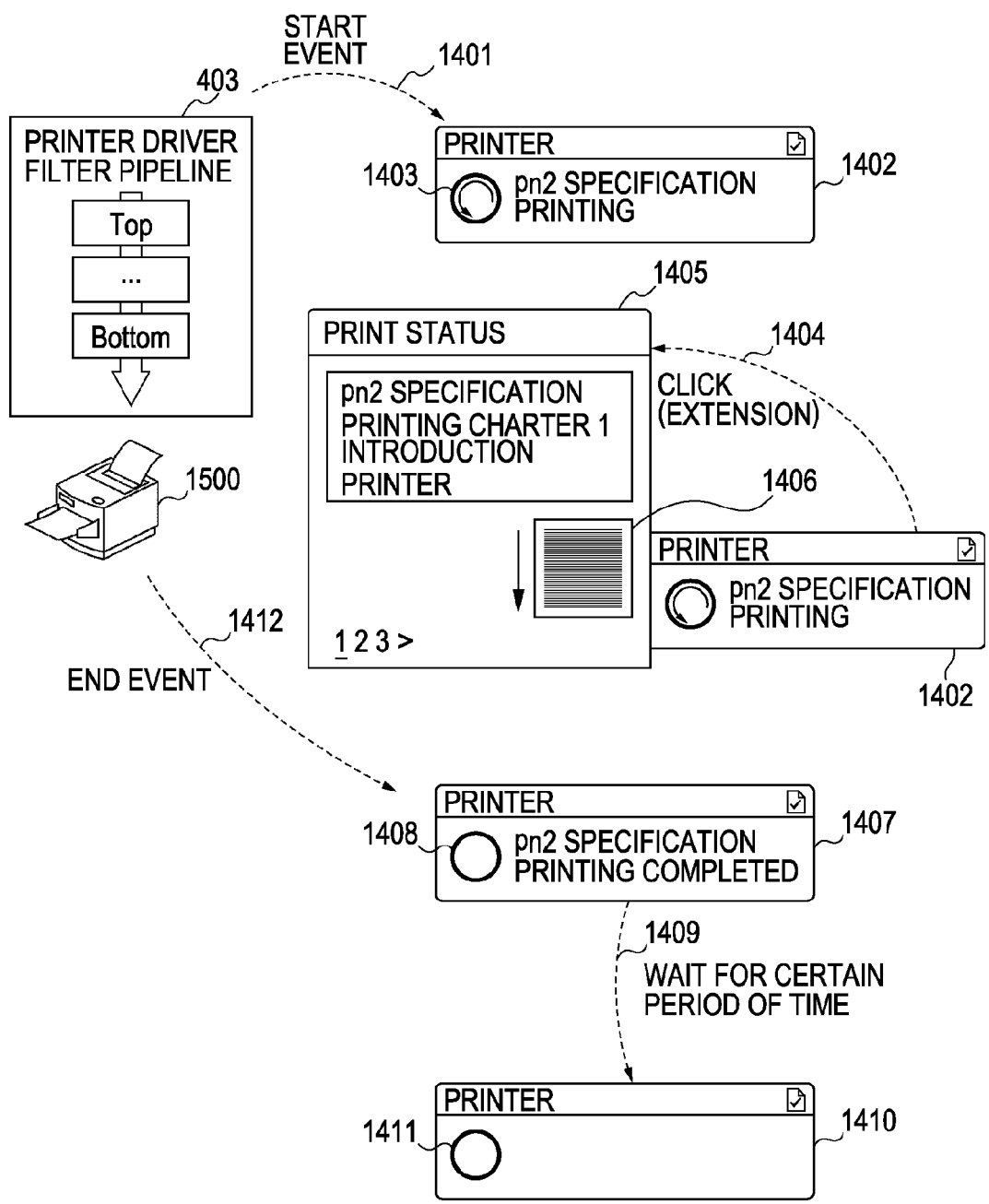
FIG. 14 illustrates an exemplary operation flow of the system.

An exemplary operation flow of an embodiment of the system is described next with reference to FIG. 14.

In this embodiment, after a print-related operation is started, the applet 410 receives a start event 1401 from the filter pipeline of the printer driver 403 or the printer 1500. The applet 410 sets information in a printer name field, a document name field, and a status field of a standard window 1402.

The applet 410 sets "Printing" in the status field and changes an icon to a printing icon 1403. When a user performs a click operation 1404 on the standard window 1402 of the applet 410, an extension window 1405 is displayed. The extension window 1405 displays more detailed information and a graph 1406. The structure of the graph 1406 is described in more detail below. When the print-related operation is completed, the applet 410 receives an end event 1412 from the filter pipeline of the printer driver 403 or the printer 1500. The applet 410 changes the information in the status field of the standard window 1407 to "Printing completed" and changes the icon to a print completion icon 1408. Thereafter, the applet 410 waits for a certain period of time 1409. Subsequently, the applet 410 changes the information in the status field of a standard window 1410 to "Ready for printing" and changes the icon to a print ready icon 1411.

An embodiment of the layout control of a graph performed by the applet 410 is described next with reference to FIGS. 15 and 16.

Figure 12:
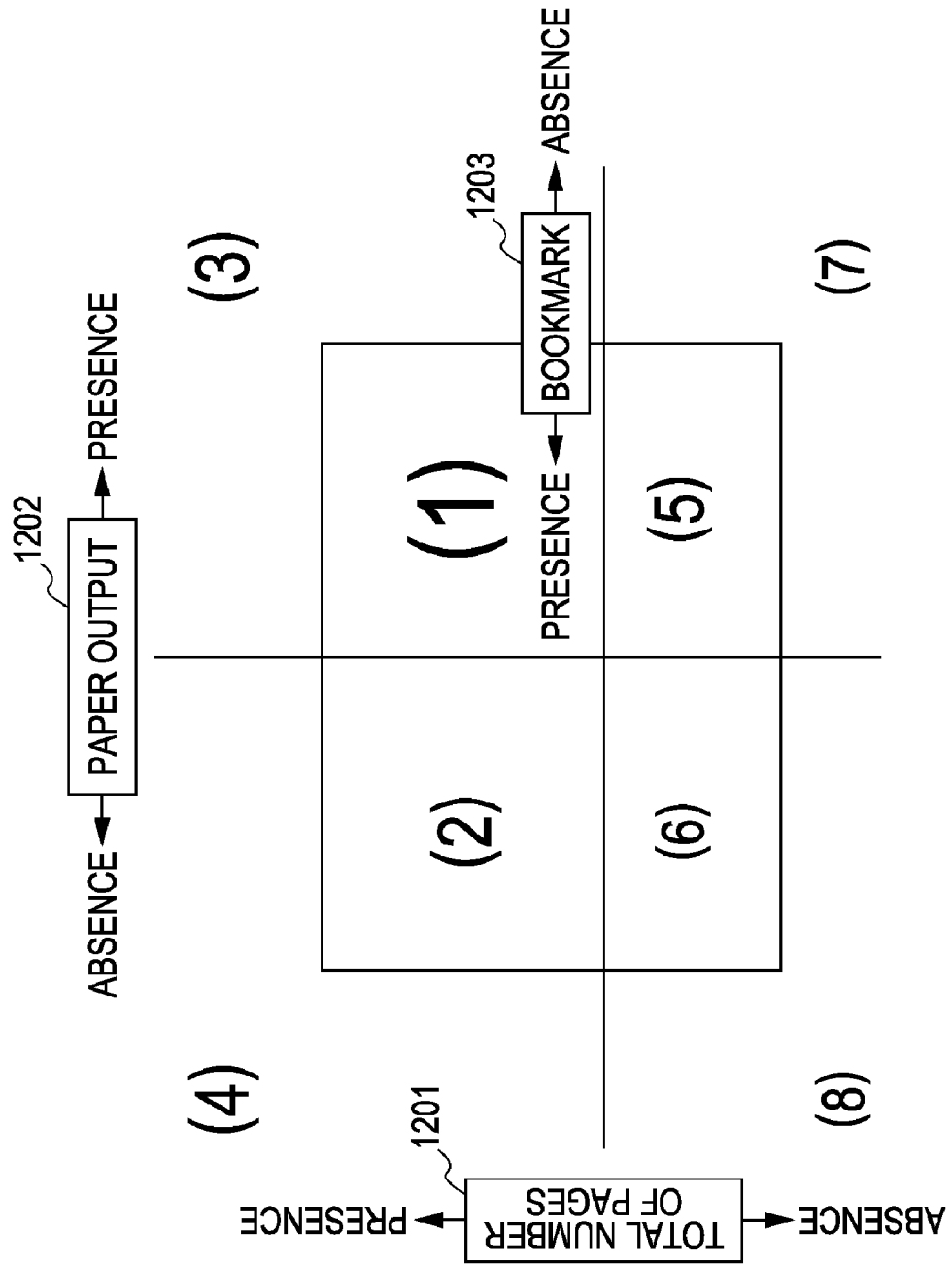
FIG. 12 illustrates an embodiment of display patterns of the processing progress.
Figure 13:
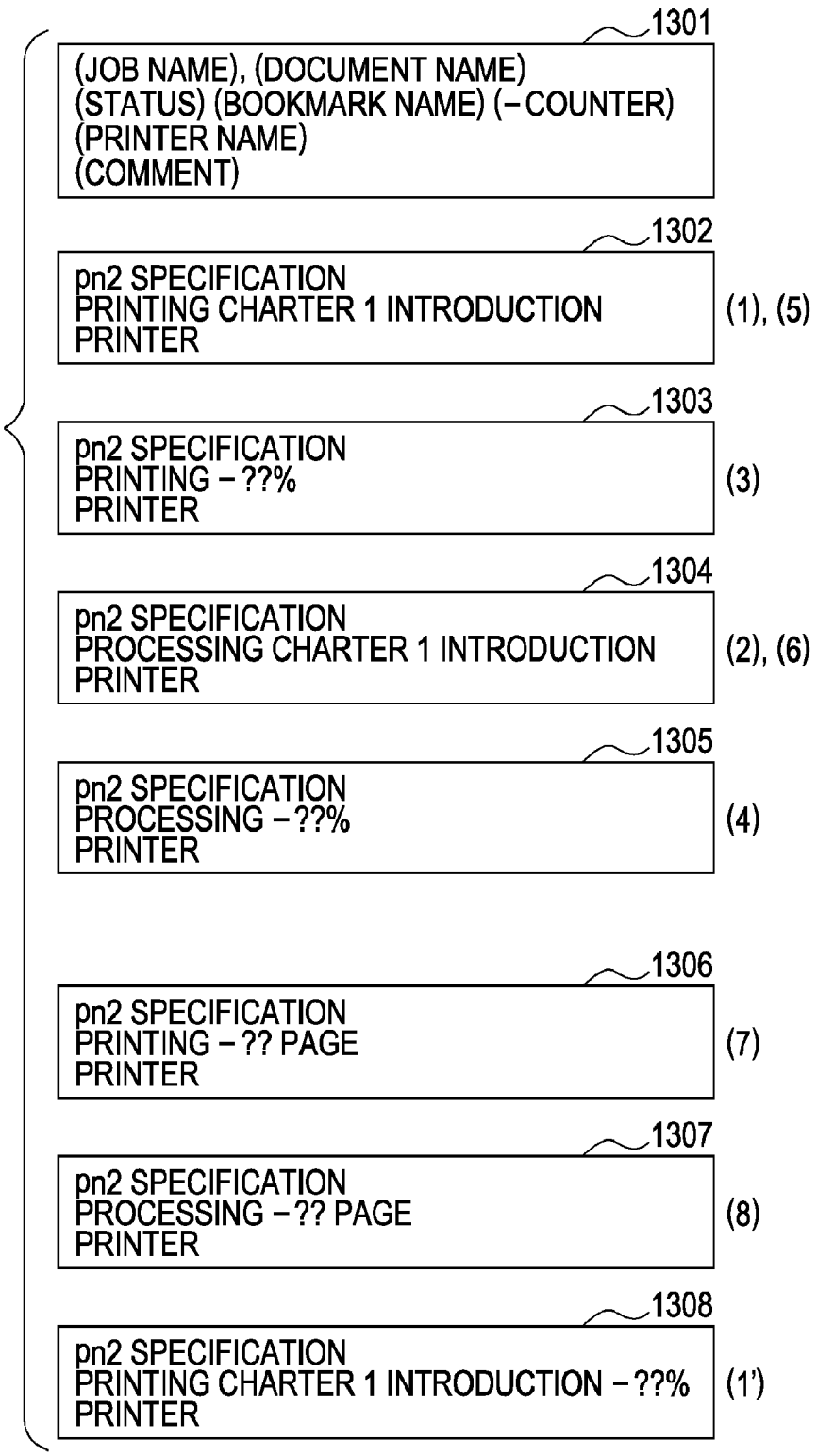
FIG. 13 illustrates an exemplary display of the processing progress using a message.

In this embodiment, the axes of the graph are changed in accordance with two conditions relating to a bookmark and the total number of pages among the three conditions described in FIGS. 12 and 13. If only one of a bookmark and the total number of pages can be referred to, the graph laid out by the applet 410 is a one-dimensional graph having one axis. However, if both the bookmark and the total number of pages can be referred to, the graph laid out by the applet 410 can be a two-dimensional graph having two axes.

Figure 15:
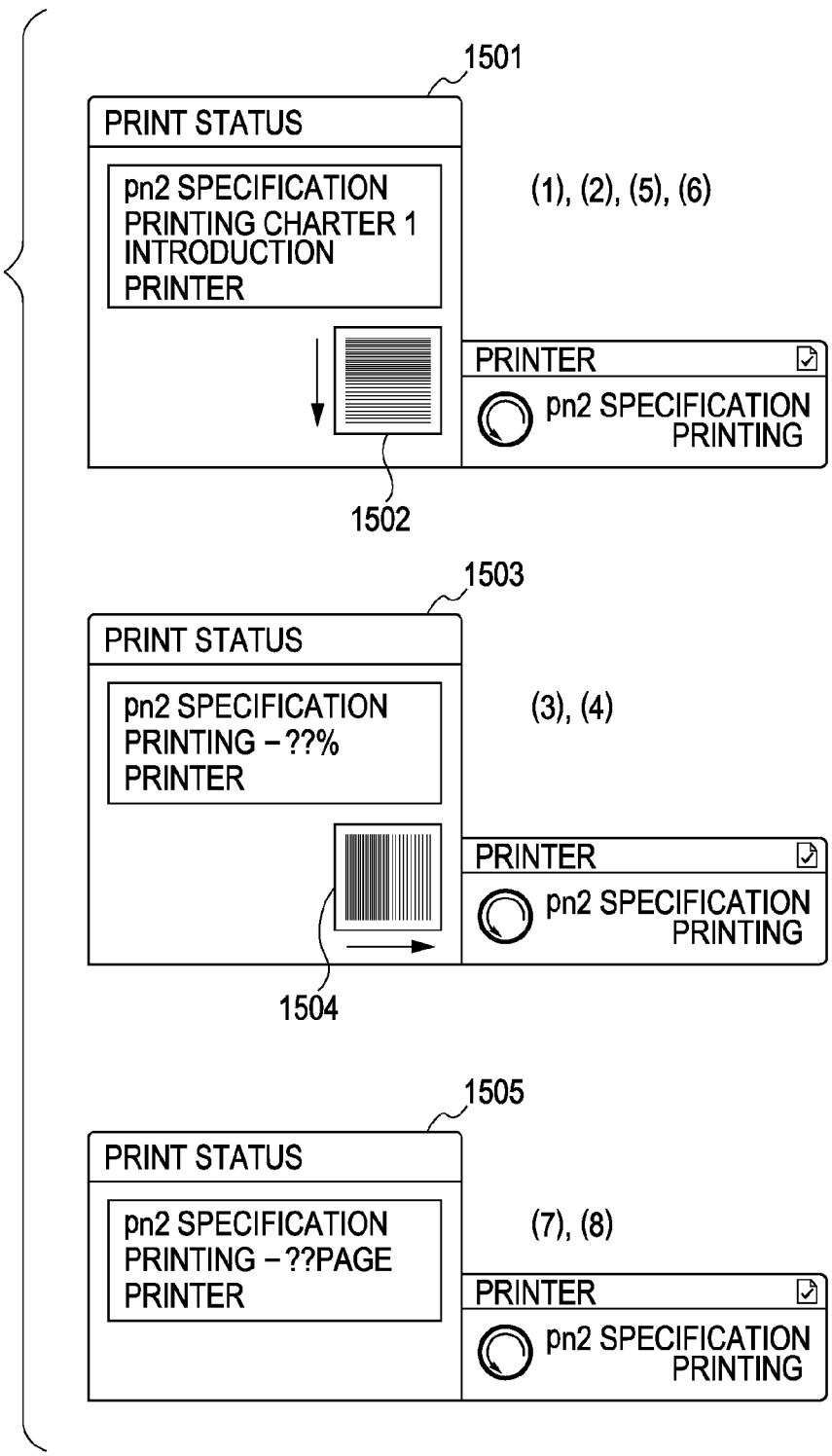
FIG. 15 illustrates an exemplary display of the processing progress using a one-dimensional graph.

FIG. 15 illustrates an example of layout of a one-dimensional graph. When information about a bookmark is present, an extension window 1501 displays a one-dimensional graph 1502 in which the Y-axis represents the bookmark. This display structure may correspond to the display structure pattern (1), (2), (5), or (6). The Y-axis of the one-dimensional graph 1502 is used for indicating the progress based on a relative relationship between all bookmarks and a bookmark corresponding to the currently processed data. The scale of the one-dimensional graph 1502 may be changed so as to fit in the display area of the one-dimensional graph 1502.

When the presence/absence condition 1201 indicates the presence of information regarding the total number of pages of the document, an extension window 1503 displays a one-dimensional graph 1504 in which the X-axis represents the total number of pages of the document. This display structure may correspond to the display structure pattern (3) or (4). The scale of the one-dimensional graph 1504 may be changed so as to fit in the display area of the one-dimensional graph 1504.

In contrast, when the presence/absence condition 1201 indicates the absence of the total number of pages of the document and the presence/absence condition 1203 indicates the absence of information about a bookmark structure of a common document, an extension window 1505 displays no graphs. This display structure may correspond to the display structure pattern (7) or (8).

Figure 16:
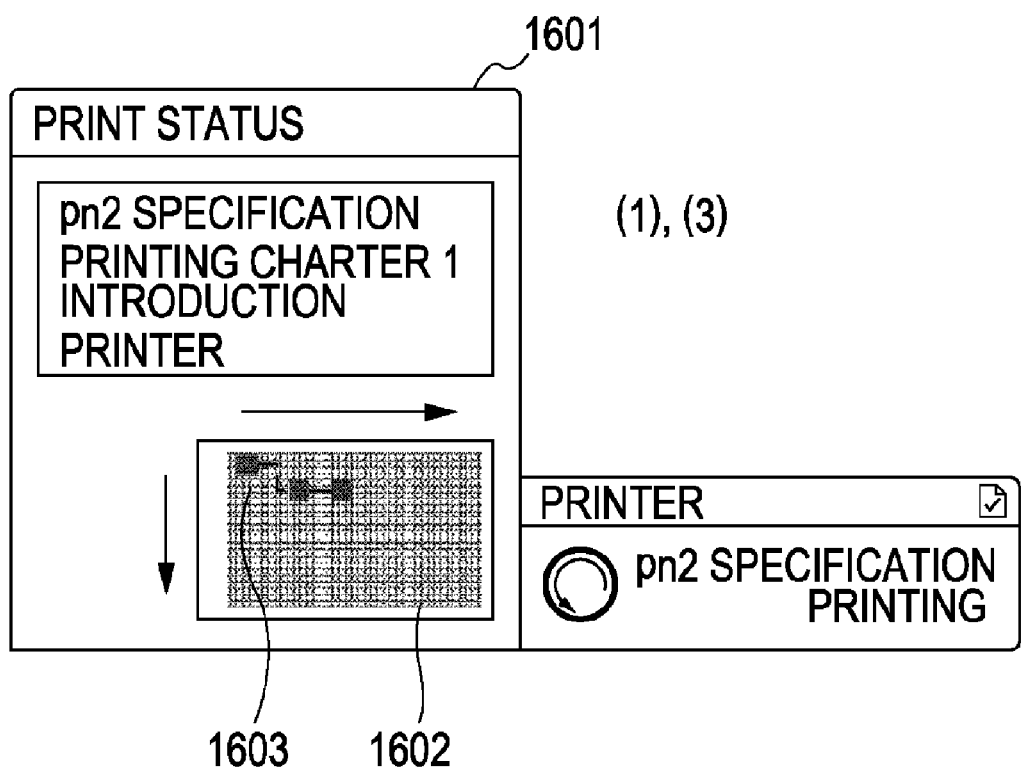
FIG. 16 illustrates an exemplary display of the processing progress using a two-dimensional graph.

FIG. 16 illustrates an example of layout of a two-dimensional graph. An extension window 1601 is displayed when the presence/absence condition 1201 indicates the presence of information regarding the total number of pages of the document and the presence/absence condition 1203 indicates the presence of information about a bookmark structure of a common document. The extension window 1601 displays a two-dimensional graph 1602 in which the X-axis represents a page number and the Y-axis represents a bookmark. This display structure may correspond to the display structure pattern (1) or (3). The two-dimensional graph 1602 may be generated by combining the information indicated by the one-dimensional graph 1502 and the information indicated by the one-dimensional graph 1504 shown in FIG. 15. The rendering example of the graph is described in more detail below. If the progress is expressed in the two-dimensional graph 1602 using a line, a polygonal line graph illustrating a relationship between a bookmark and the page number may be generated. The events of the filter pipeline of the printer driver 403 and the printer 1500 may be plotted on a polygonal line 1603.

Figure 17:
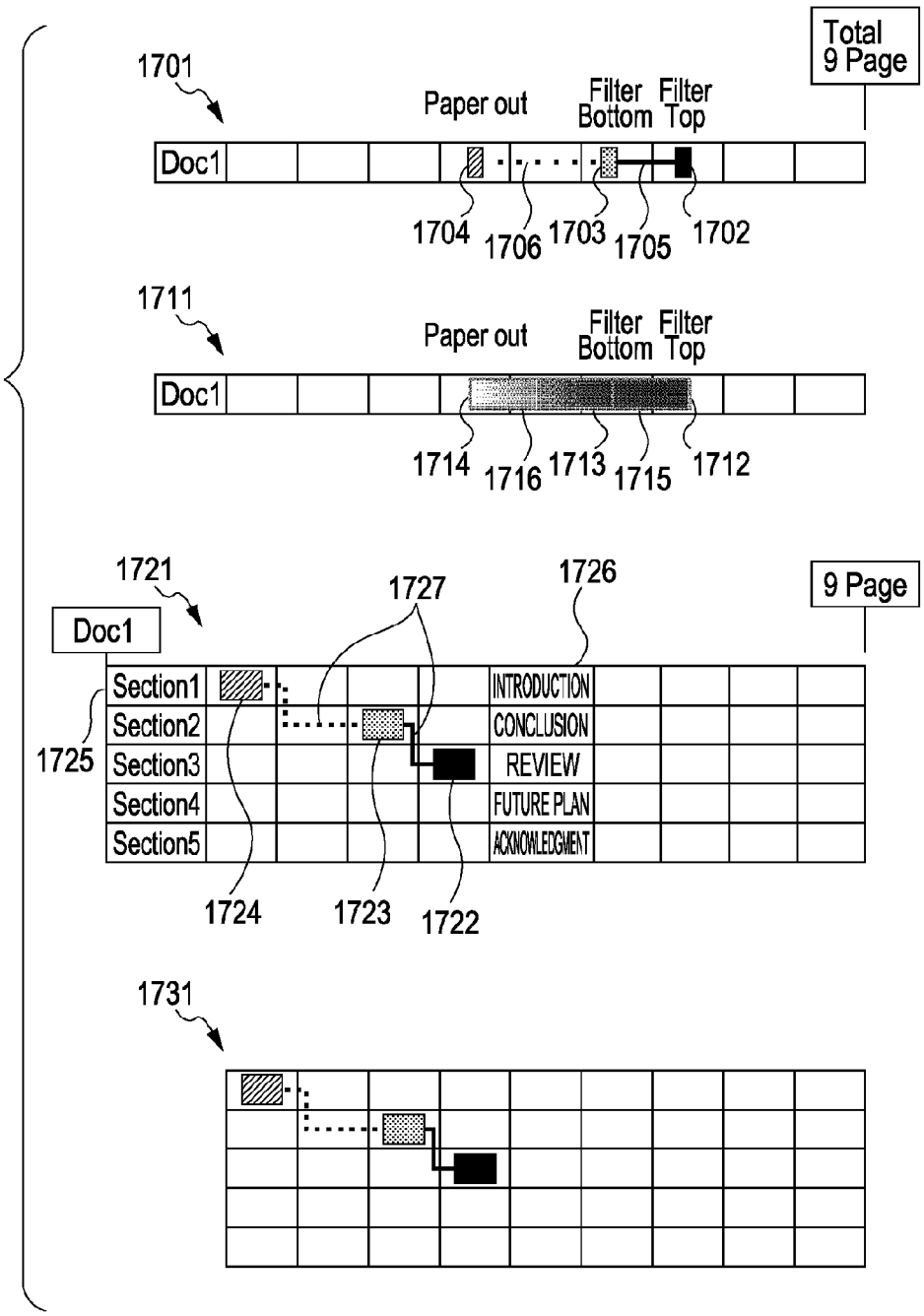
FIG. 17 illustrates an example of display of the detailed processing progress using a two-dimensional graph.

An example of the display of a graph performed by the applet 410 is described next with reference to FIG. 17.

In this example, a graph 1701 shows the printing progress of a 9-page document. The graph 1701 is a one-dimensional graph in which the X-axis represents the pages. The passage events 1702 and 1703 of the top and bottom filters of the filter pipeline of the printer driver 403 and a paper output event 1704 of the printer 1500 are plotted in the graph 1701. The plotted points are connected using lines 1705 and 1706. The set of the plotted points moves from the left to right in accordance with the occurrence of the events. When the paper output event 1704 eventually moves to the last page, the printing operation is completed. In this example, the graph 1701 indicates that the fourth page is being output and the seventh page is in a filter top (the processing of the seventh page is started).

A graph 1711 is similar to the graph 1701. However, instead of connecting the plotted points using the lines 1705 and 1706, the printing progress is illustrated using a rectangle 1715. The passage events 1712 and 1713 of the top and bottom filters of the filter pipeline of the printer driver 403 and a paper output event 1714 of the printer 1500 are represented by vertical lines of the rectangle. A line between plotted points is represented by a horizontal line 1716 of the rectangle.

A graph 1721 indicates the printing progress of a 9-page 5-section document. The graph 1721 is a two-dimensional graph in which the X-axis represents pages and the Y-axis represents a bookmark structure. It can be considered that, when common data includes bookmark information, the graph 1701 having only an X-axis may be expanded in the Y-axis direction so that the graph 1721 is displayed. In the graph 1721, a broken line (also referred to as a "progress line") 1727 indicating a relationship between a bookmark (Y) and a page (X) represents the progress of print data. The passage events 1722 and 1723 of the top and bottom filters of the filter pipeline of the printer driver 403 and a paper output event 1724 of the printer 1500 are plotted on the progress line 1727. The set of the three plotted points moves from the upper left to the lower right in accordance with the occurrence of the events. When the paper output event eventually moves to the lower right, the printing operation is completed. In addition, the graph 1721 can display the bookmark structure in the form as indicated by a level 1725. Furthermore, the graph 1721 can display a bookmark name in the form of a character string 1726. If the display area for the graph is small, all of the items may not necessarily be displayed.

When the labels and the character strings are removed from the graph 1721, a graph 1731 is generated. Since the information indicated by a character string may be separately displayed as shown in FIG. 13, the user may be able to obtain all the information even in such a case.

If the graph has a pixel display area having a size of (the number of bookmarks)×(the number of pages), a pixel can represent, and may even exactly represent, the relationship between a bookmark and a page. If one of the number of bookmarks and the number of pages is larger than the graph display area, the size of the graph display area may be reduced. In such a case, for example, the original width can be set to 100%, the ratio of the reduced width to the original width can be computed, and the original width and height (axes) can be reduced using the ratio. A scale of "10%", "20%", "30%", ... or a scale of "20%", "40%", "60%", ... can be used for the axes.

An embodiment of the option setting operation of the applet 410 is described next with reference to FIG. 18.

In this embodiment, when a button displayed in a standard window 1801 is pressed (a button pressing operation 1802), an option dialog 1803 is opened. The user can set the options regarding the display of the applet 410 using the option dialog 1803.

When an "OFF" radio button 1806 is chosen, the applet 410 does not display the printing progress.

In contrast, when an "ON" radio button 1804 is chosen, check boxes for options 1805 including "Bookmark included", "Large Job", and "Long Paper Output Time" become effective. If the check box "Bookmark Included" is checked, the applet 410 displays the printing progress only when bookmark information is present. If the check box "Large Job" is checked, the applet 410 displays the printing progress only when the job size is greater than a predetermined threshold value. If the check box "Long Paper Output Time" is checked, the applet 410 displays the printing progress only when a time interval between continuously output sheets of paper is greater than a predetermined threshold value. Note that the printing progress may be displayed when the applet 410, during a printing process thereof, determines that the processing time regarding each of the options 1805 exceeds a predetermined period of time.

Flowchart of Operation of System

Figure 19A:
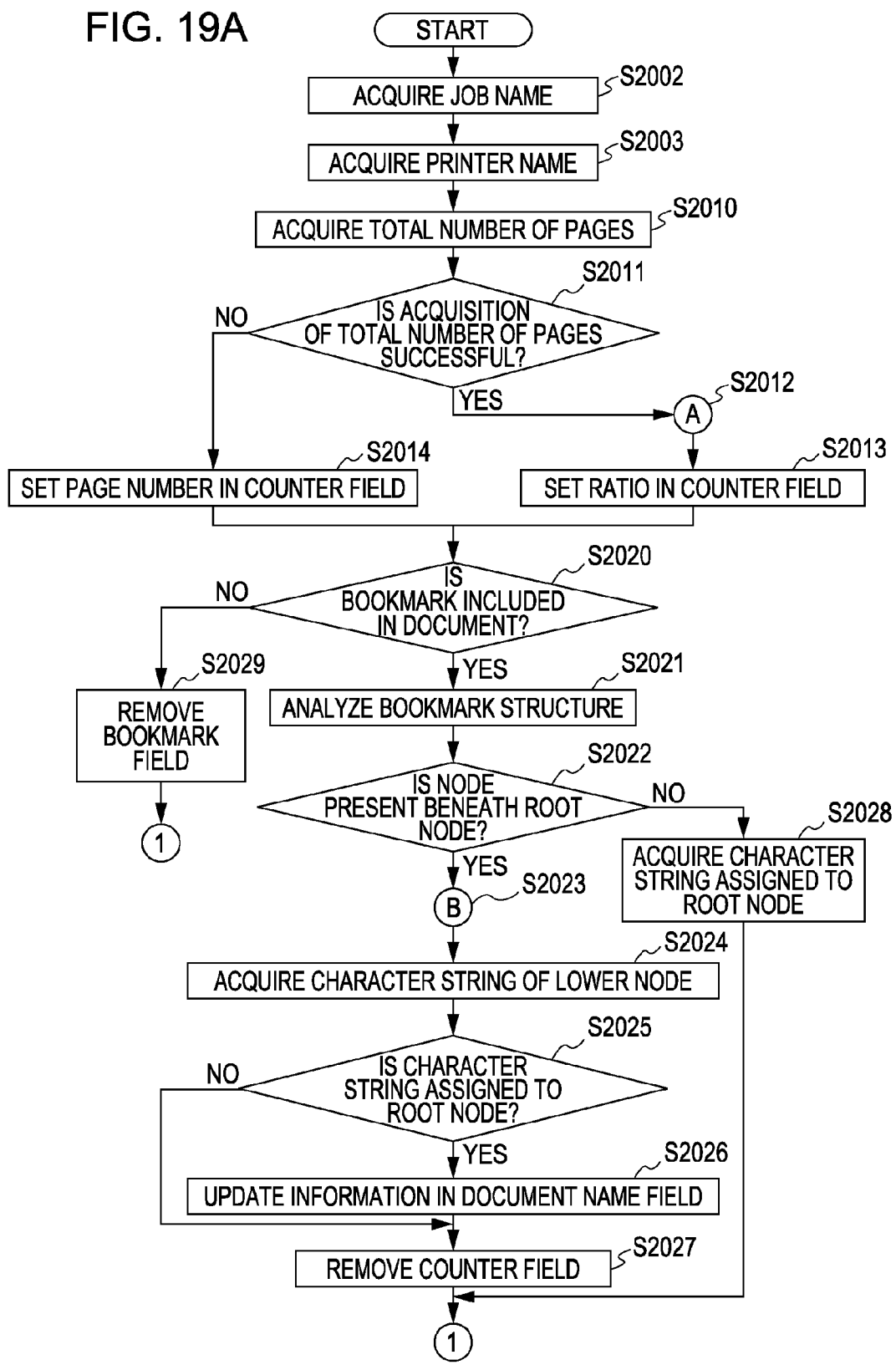
FIGS. 19A and 19B illustrate an embodiment of a flowchart when the system displays the processing progress using a message.

Exemplary display processing performed by the applet 410 in accordance with an embodiment of the printing progress is described next with reference to a flowchart shown in FIGS. 19A and 19B.

According to this embodiment, in step S2002, the applet 410 acquires a job name from JOBINFO of a common document to be subjected to print processing and an XPS print path.

In step S2003, the applet 410 acquires a printer name from JOBINFO of the common document to be subjected to print processing and the XPS print path.

In step S2010, the applet 410 acquires the total number of pages from JOBINFO of the common document to be subjected to print processing and the XPS print path (i.e., counts the pages while referring to the document structure). After the applet 410 has acquired the total number of pages (YES in step S2011), processing proceeds to step S2013, where the applet 410 sets the ratio in a counter field. If the total number of pages cannot be acquired (NO in step S2011), processing proceeds to step S2014, where the applet 410 sets the page number in the counter field.

In step S2020, the applet 410 determines whether the common document to be subjected to print processing includes a bookmark. If, in step S2020, the common document includes a bookmark (YES in step S2020), processing proceeds to step S2021, where the applet 410 analyzes the bookmark structure (the document structure).

In step S2022, the applet 410 determines whether a node is present under the uppermost root of the bookmark structure (e.g., a node having a value "pn2 specification" shown in FIG. 8).

If, in step S2022, it is determined that a node is present under the root of the bookmark structure (YES in step S2022), processing proceeds to step S2024, where the applet 410 acquires a character string in the lower node (e.g., a value "cover" shown in FIG. 8). This value is used for information displayed in the bookmark field.

Processing then advances to step S2025. If, in step S2025, it is determined that the root node has a value (e.g., a value "pn2 specification" shown in FIG. 8) (YES in step S2025), processing proceeds to step S2026, where the applet 410 updates the value displayed in the document name field.

Processing then advances to step S2027, where the applet 410 performs control so that a counter is not used, since the bookmark can be used.

However, if, in step S2022, it is determined that a node is not present under the root of the bookmark structure (NO in step S2022), processing advances to step S2028, where the applet 410 sets the value displayed in the bookmark field to the character string assigned to the root node.

If, in step S2020, it is determined that the common document to be subjected to print processing includes no bookmarks (NO in step S2020), processing advances to step S2029, where the applet 410 performs control so that a bookmark is not used for an item to be displayed.

Figure 19B:
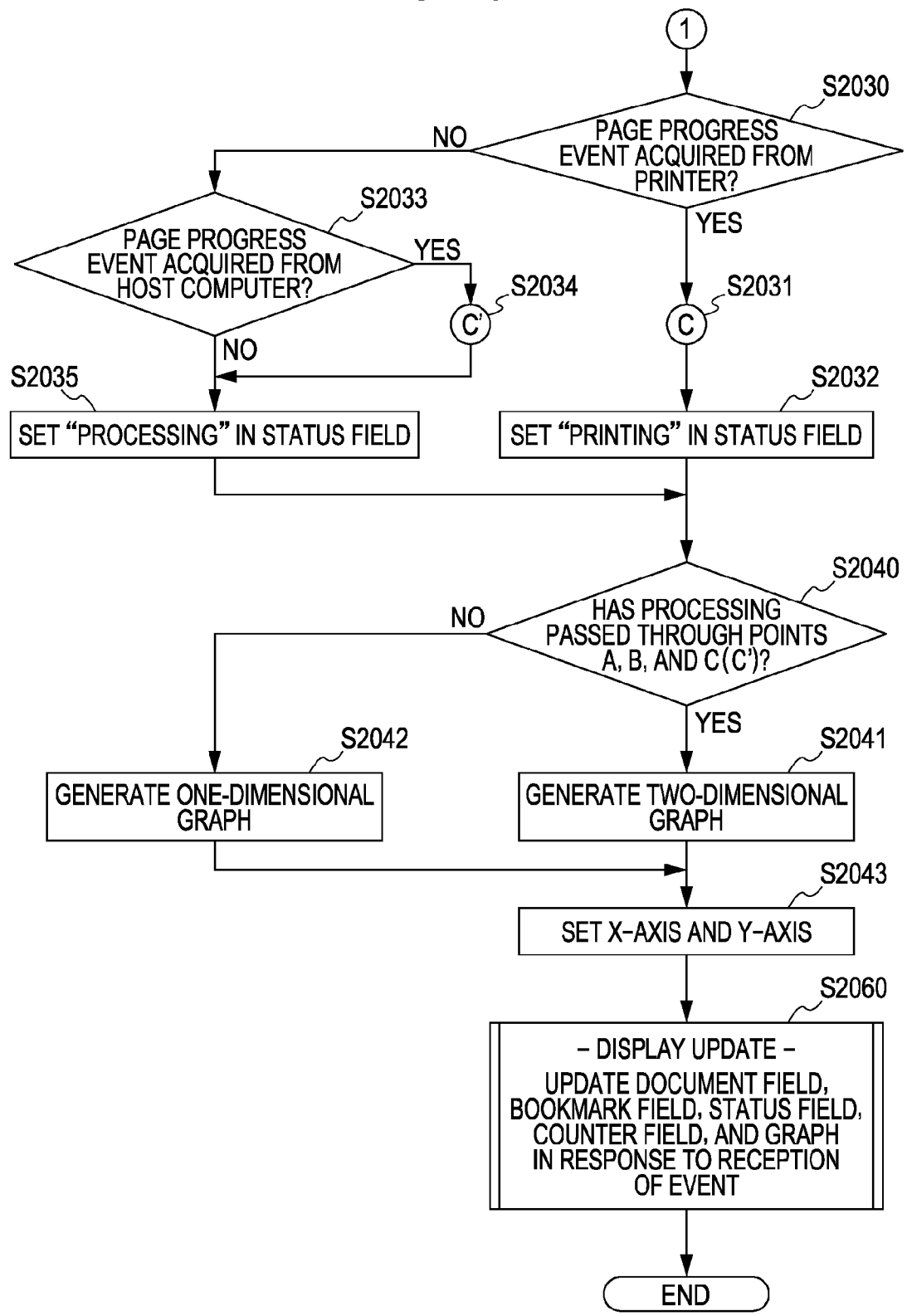

As shown in FIG. 19B, in step S2030, the applet 410 determines whether a page progress event of a printer can be acquired from a process of the printer.

If, in step S2030, it is determined that a page progress event of a printer can be acquired (YES in step S203), processing proceeds to step S2032, where the applet 410 sets the value in the status field to "printing" via a point C (step S2031).

However, if, in step S2030, it is determined that a page progress event of a printer cannot be acquired (NO in step S2030), processing proceeds to step S2033, where the applet 410 determines whether the page progress of the host computer can be acquired. If it is determined that a page progress event of a printer can be acquired (YES in step S2033), processing proceeds to step S2035, where the applet 410 sets the value in the status field to "processing" via a point C' (step S2034).

In step S2040, the applet 410 determines whether the processing has passed through all of a point A (step S2012 between step S2011 and step S2013), a point B (step S2023 between step S2022 and step S2024), and the point C (step S2031) or all of a point A (step S2012), a point B (step S2023), and the point C' (step S2034).

If, in step S2040, it is determined that the processing has passed these points (YES in step S2040), processing advances to step S2041, where the applet 410 determines that a two-dimensional graph can be generated.

However, if, in step S2040 it is determined that the processing has not passed these points (NO in step S2040), then processing advances to step S2042, where the applet 410 determines that a one-dimensional graph can be generated.

In step S2043, the applet 410 sets the X-axis and the Y-axis of the graph in accordance with the state of passage of the points A, B, and C (C').

In step S2060, the applet 410 updates the values displayed in the document, bookmark, status, and counter fields in accordance with the events received from the host computer and the printer. The displayed graph is updated in synchronization with the update of these values.

An exemplary display operation of a graph performed by the applet 410 in accordance with an embodiment of the progress of the print processing is described next with reference to a flowchart shown in FIGS. 20A and 20B. In this exemplary operation, a two-dimensional graph is rendered.

Figure 20A:
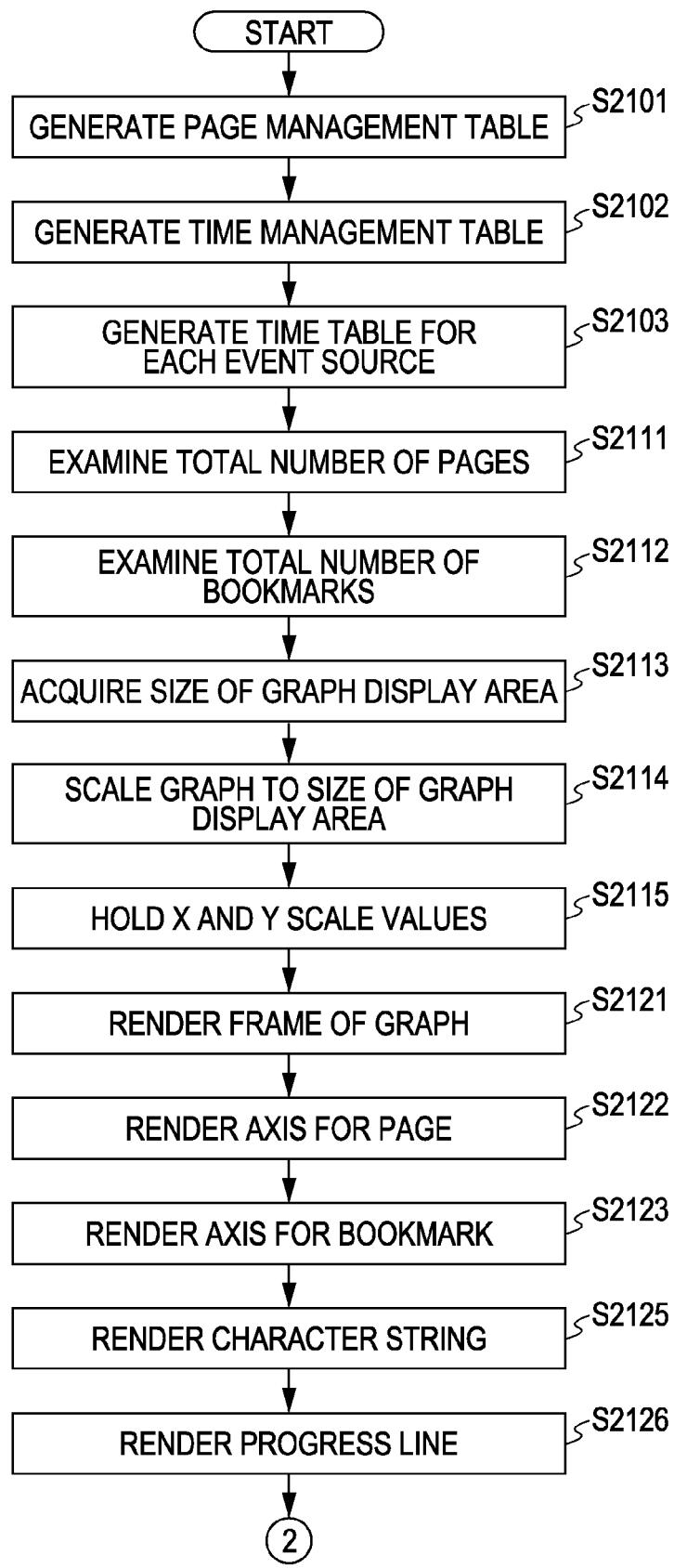
FIGS. 20A and 20B illustrate embodiments of flowcharts when the system displays the processing progress using a graph.

In the embodiment as shown in FIG. 20A, in step S2101, the applet 410 generates the page management table 1106.

In step S2102, the applet 410 generates the time management table 1107.

In step S2103, the applet 410 generates the time table 1108 for each of event sources.

In step S2111, the applet 410 acquires the total number of pages. In step S2112, the applet 410 acquires the total number of bookmarks.

In step S2113, the applet 410 acquires the size of a graph display area. In step S2114, the applet 410 changes the size of the graph so that the graph fits the graph display area. In step S2115, the applet 410 stores the scale values for the X-axis and Y-axis of the graph. The applet 410 then renders a static portion of the graph image, such as the axes. In step S2121, the applet 410 renders a frame of the graph. In step S2122, the applet 410 renders the axis based on the number of pages. In step S2123, the applet 410 renders the axis based on the bookmarks.

In step S2125, the applet 410 renders the character string 1726. In step S2126, the applet 410 renders a progress line indicating the relationship between a page number and a bookmark. Note that these rendering processes of the static portions of the graph may be performed in any order.

Subsequently, the applet 410 renders dynamic portions of the graph, such as plotted points.

Figure 20B:
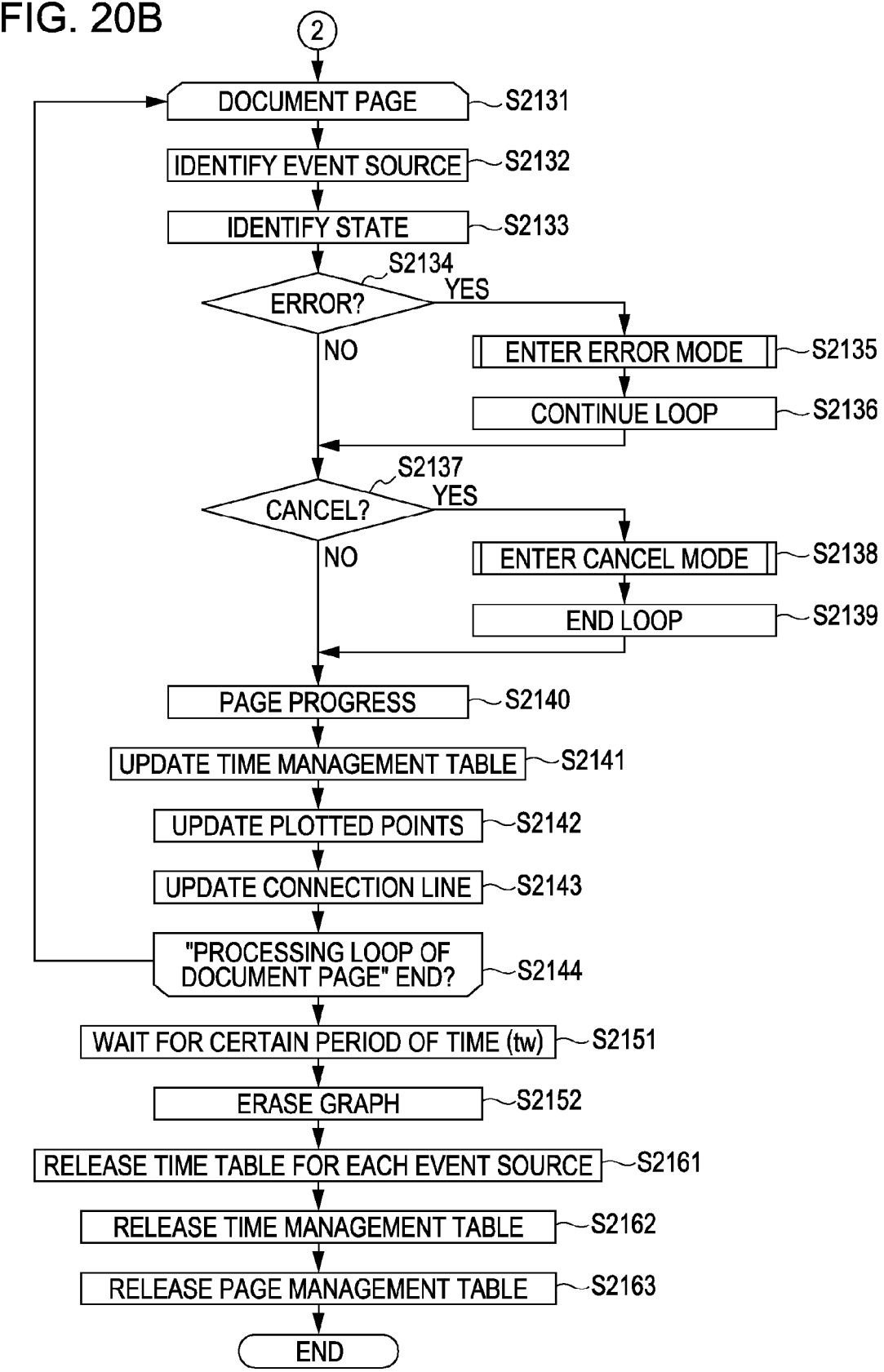

In step S2131 as shown in the embodiment of FIG. 20B, the applet 410 enters a processing loop in which the events of the document pages are managed. In step S2132, the applet 410 identifies the source of a received event. In step S2133, the applet 410 identifies the current event and the state of the job.

In step S2134, the applet 410 determines whether a received event is an error event on the basis of the identification performed in step S2133. If the received event is an error event (YES in step S2134), processing proceeds to step S2135, where the applet 410 enters an error mode. Processing then advances to step S2136, where the applet 410 continues the processing loop after setting the document processing to an error mode. However, if the received event is not an error event (NO in step S2134), the processing proceeds to step S2137.

In step S2317, the applet 410 determines whether the received event is a cancel event on the basis of the identification performed in step S2133. If the received event is a cancel event (YES in step S2317), processing proceeds to step S2138, where the applet 410 enters a cancel mode. Processing then advances to step S2139, where the applet 410 stops the processing loop after setting the document processing to a cancel mode. However, if the received event is not a cancel event (NO in step S2137), the processing proceeds to step S2140.

In step S2140, the applet 410 processes a page progress event (e.g., the physical page break event 906) and page change data.

Processing then advances to step S2141, where the applet 410 updates the time table and the time management table indicating the processing progress of the event corresponding to the identification. Advancing to step S2142, the applet 410 updates the plotted points in the graph. In step S2143, the applet 410 updates the connection line between the plotted points.

When the processing of the document pages is completed, the processing performed by the applet 410, in step S2144, exits the processing loop, and returns to step S2131.

As described above, the applet 410 provides a mechanism for performing control so that the information regarding the common document 405 and the print path and the events sent from each of the printing processes, the OS, and the timer are managed and displayed. However, the applet 410 does not send a cancel request to the processes that are performing printing operations.

In step S2151, the applet 410 waits for a predetermined period of time so that the user can view the graph. Thereafter, the applet 410, in step S2152, erases the image of the graph. In step S2161, the applet 410 releases the time table for each of the event sources. In step S2162, the applet 410 releases the time management table. In step S2163, the applet 410 releases the page management table.

Figure 21A:
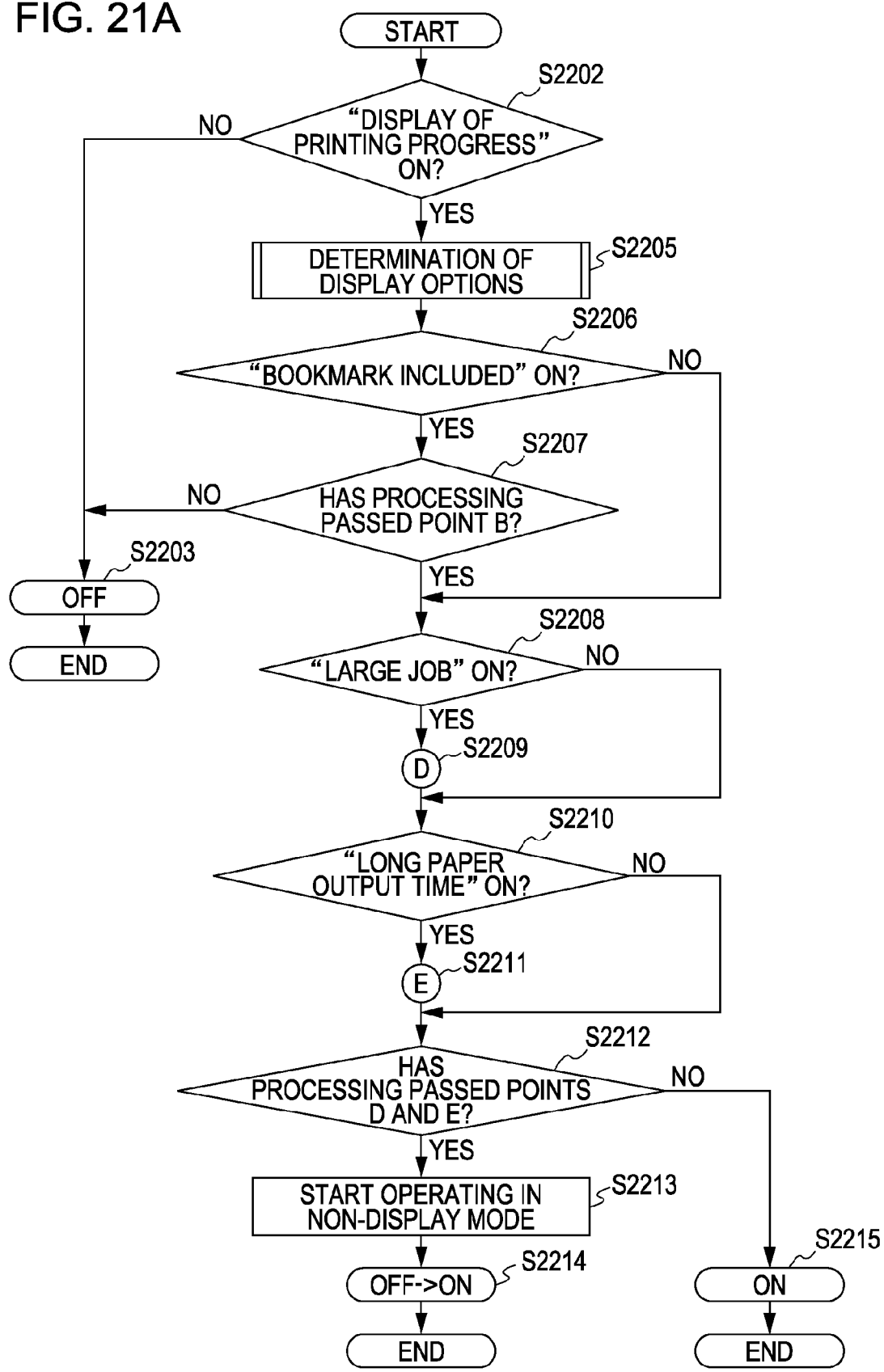
FIGS. 21A and 21B illustrate embodiments of flowcharts when option setting is performed for the system.

The processing of option setting for the display of an embodiment of printing progress performed by the applet 410 is described next with reference to a flowchart shown in FIGS. 21A and 21B. This processing may be performed after the processing shown in FIGS. 19A and 19B has been completed.

Figure 18:
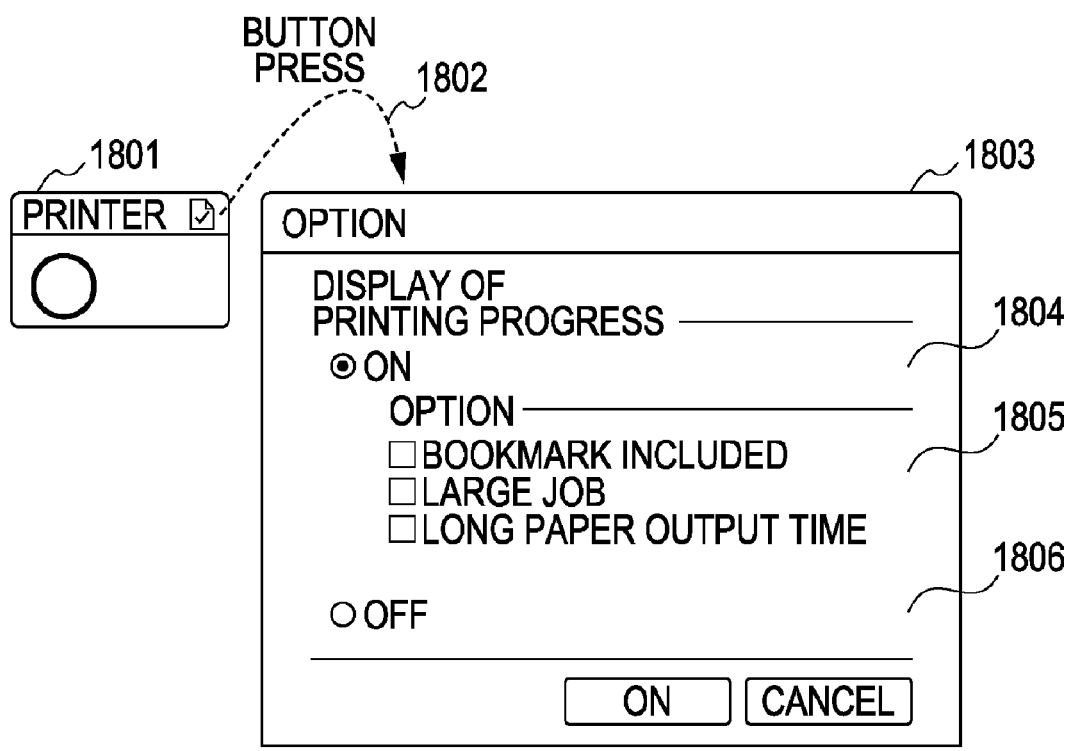
FIG. 18 illustrates an example of option setting performed through an operation unit of the system.

If the progress display radio button shown in FIG. 18 is set to "OFF" (NO in step S2202), processing advances to step S2203, and the applet 410 performs control so that the display setting is set to an "OFF" mode in step S2203. However, if the progress display radio button is set to "ON" (YES in step S2202), the processing proceeds to step S2205.

In step S2205 and the subsequent steps, the applet 410 determines whether each of the options is activated through the setting screen shown in FIG. 18.

In step S2206, the applet 410 determines whether the setting item "Bookmark Present," e.g. "Bookmark Included" is ON (i.e., whether the check box is checked or not). If the setting item "Bookmark Present" is OFF (NO in step S2206), the processing proceeds to step S2208. If the setting item "Bookmark Present" is ON (YES in step S2206), processing advances to step S2207. If it is determined in step S2207 that the processing has not passed through the point B (i.e., step S2023) (NO in step 2207), processing advances to step S2203, where the applet 410 performs control so that the printing progress is not displayed (the OFF mode). However, if the processing has passed through the point B (i.e., step S2023) (YES in step S2207), the processing proceeds to step S2208.

In step S2208, the applet 410 determines whether the setting item "Large Job" is set to ON (i.e., whether the check box is checked or not). If the setting item "Large Job" is ON (YES in step S2208), the processing proceeds to step S2210 via a point D (i.e., step S2209). However, if the setting item "Large Job" is OFF (NO in step S2208), the processing directly proceeds to step S2210 (i.e., without passing through point D).

In step S2210, the applet 410 determines whether the setting item "Long Paper Output Time" is set to ON (i.e., whether the check box is checked or not). If the setting item "Long Paper Output Time" is ON (YES in step S2210), the processing proceeds to step S2212 via a point E (i.e., step S2211). However, if the setting item "Long Paper Output Time" is OFF (NO in step S2210), the processing directly proceeds to step S2212 (i.e., without passing through point E).

In step S2212, the applet 410 determines whether the processing has passed through the point D (step S2209) and the point E (step S2211). If the processing has passed through the points D and E (YES in step S2212), processing proceeds to step S2213, where the applet 410 starts the operation thereof in a display disable mode. The processing then proceeds to step S2214. In step S2214, the applet 410 performs control so that the display is performed on the basis of the determination made in step S2221 and the subsequent steps (an OFF-to-ON mode) (step S2214). However, if the processing has not passed through the points D and E (NO in step S2212), processing advances to step S2215, where the applet 410 performs control so that the display is performed (the ON mode).

Figure 21B:
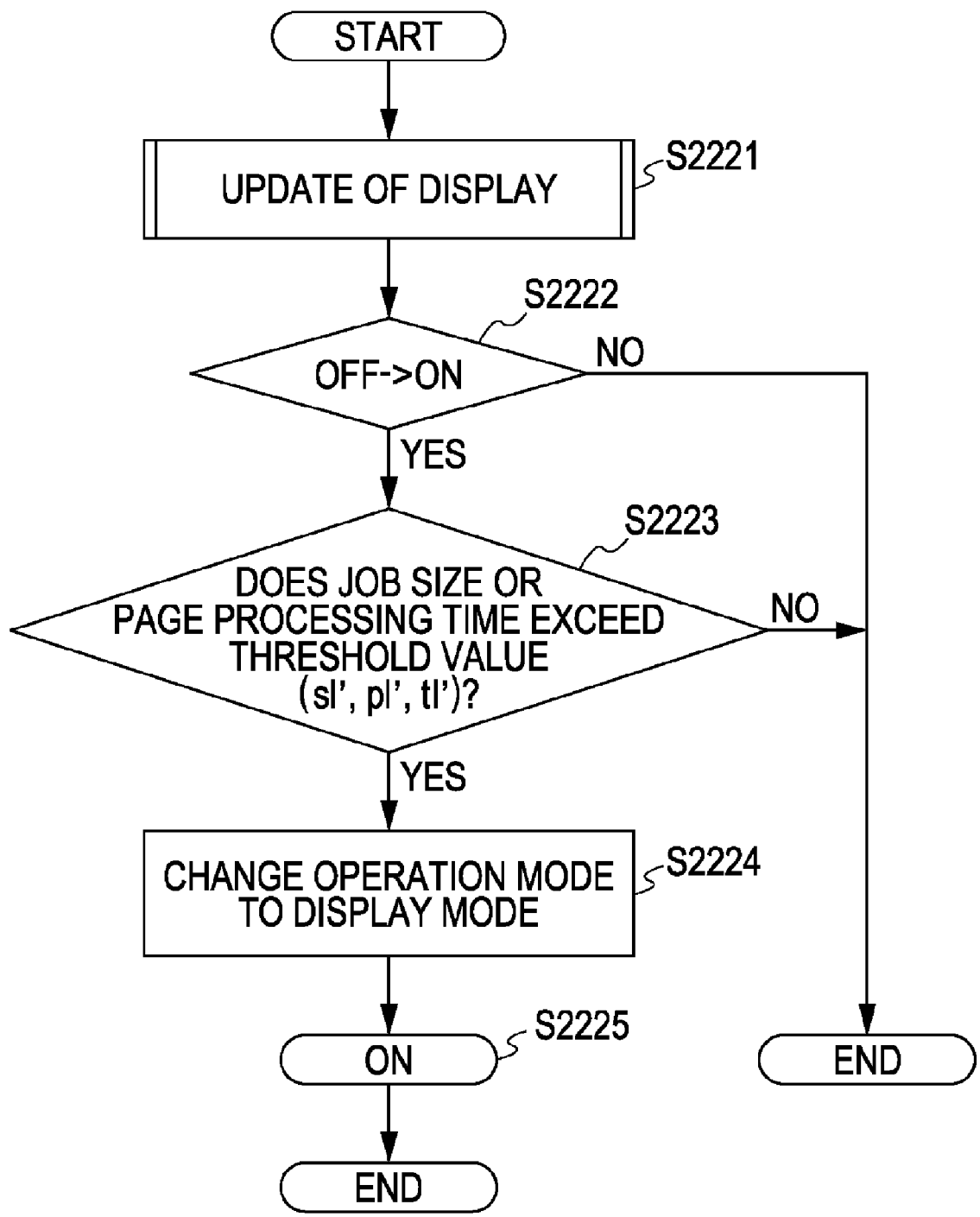

In step S2221 and the subsequent steps, as shown for example in FIG. 21B, it is determined whether the display mode is switched during a printing process. In step S2222, it is determined whether the setting of the display of the progress performed by the applet 410 is based on the setting set in step S2214 (the OFF-to-ON mode). When the setting is an "OFF-to-ON mode" (YES in step S2222), processing advances to step S2223, where if the job size or a page processing time exceeds a predetermined threshold value (YES in step S2223), processing advances to step S2224, and the applet 410 enables the display. Processing then advances to step S2225, where the applet 410 sets the display mode to an ON mode and performs control so that the screens shown in FIGS. 15 and 16 are displayed.

A document file subjected to a printing process may have an open electronic document format. A lower-layer print process can refer to the information regarding a document file having a spool file format. According to the present embodiment, using the change in the function of this process, a problem occurring in a print status display operation can be solved.

For example, more detailed information can be displayed by using the information regarding a document file (a document) and a document structure (a bookmark structure). In addition, the progress of processing performed in a plurality of filters of a host computer and information regarding paper output after printing is completed, which is obtained from a printer, can be displayed. That is, the information about a bookmark and the processing progress of each process in the print path can be detected and displayed. Accordingly, the user can recognize, using the bookmark information, which page of the document is currently processed or what information is included in a printed page even after printing process is completed.

Application of System

Figure 22:
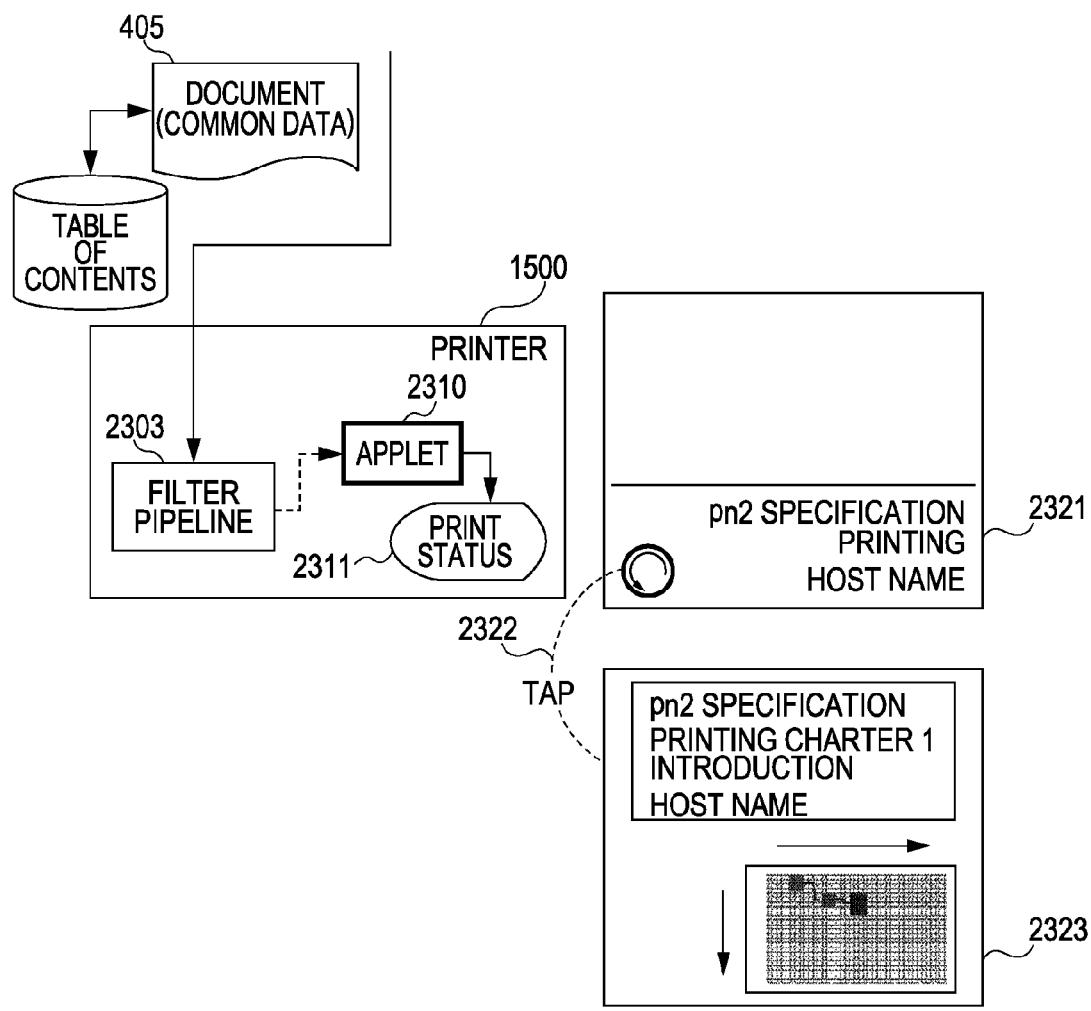
FIG. 22 illustrates a first application example of the system.

A second exemplary embodiment about an application of system is described as follows. A first application example of the system is described next with reference to FIG. 22.

A filter pipeline 2303, an applet 2310, a printing status display unit 2311, and the above-described printing processes of the system are disposed in the printer 1500. According to the present exemplary embodiment, the printer 1500 displays the printing progress regarding print data on a display unit thereof.

According to the present exemplary embodiment, when the common document 405 is delivered to the printer 1500, a standard window 2321 of the applet 2310 is displayed. When the window is tapped (a tapping operation 2322), an extension window 2323 is displayed. In order to monitor the operation and the display of the applet 2310, a remote access unit may be used.

A second application example of the system is described next with reference to FIG. 23 and FIGS. 24A to 24D.

Figure 23:
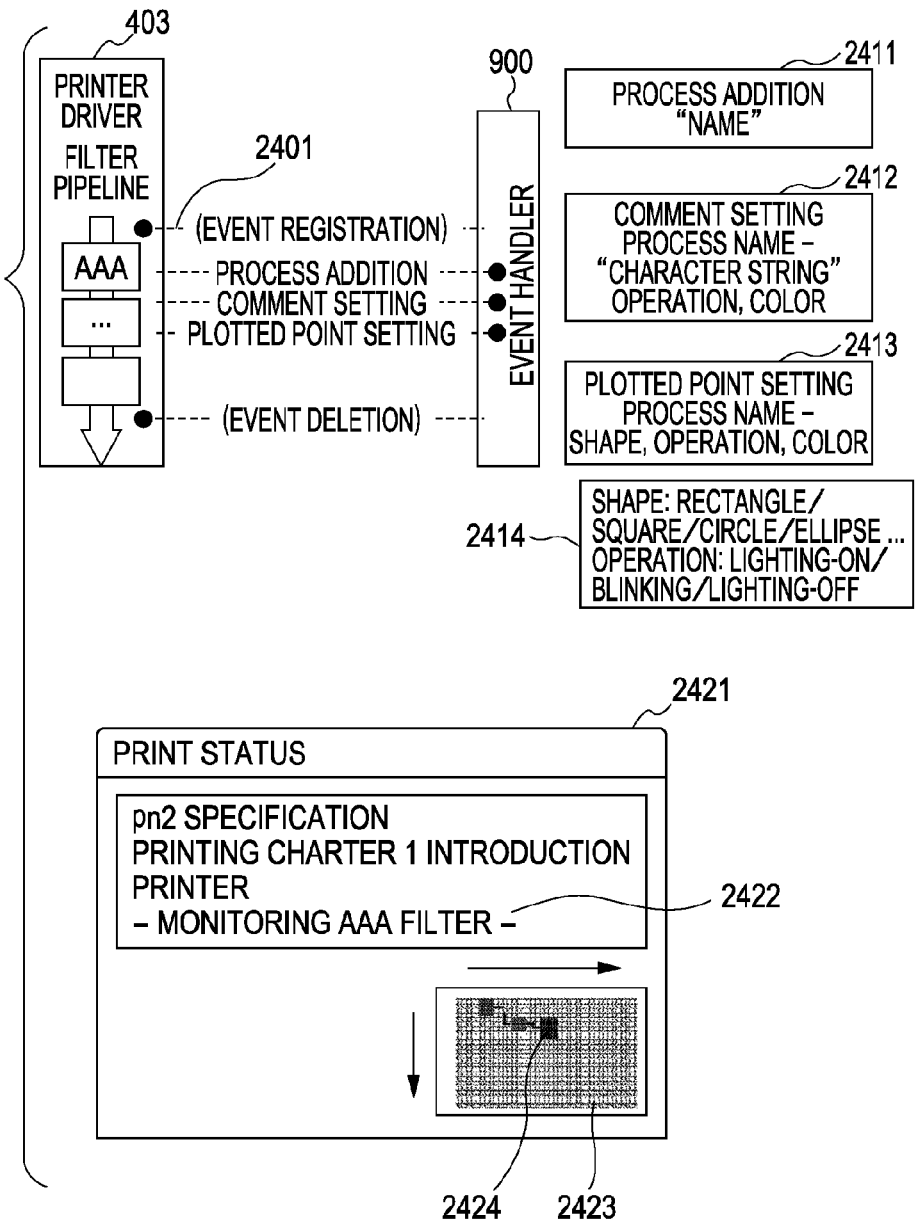
FIG. 23 illustrates a second application example of the system.

FIG. 23 is a schematic illustration of the second application example. If a process of an additional program is added to the printing process of a host computer, this system may provide a method for determining an activated process including the additional process and displaying the processing progress of the process using the applet 410. An example of the additional process may be a process regarding a print monitoring operation, such as a process for obtaining a printed image as a log. In the second application example, the system informs a user of the presence of a print monitoring system filter by using the applet 410, and the user uses the filter for customizing the display information of the progress through the applet 410.

An additional process AAA in the filter pipeline of the printer driver 403 sends an event to the event handler 900 when a registration event 2401 occurs. A process addition event 2411 sent from the printing process includes the name of the process in the form of a parameter. A comment setting event 2412 sent from the printing process includes the name of a process to be processed, a character string to be displayed, a type of operation, and a color in the form of parameters. A plotted point setting event 2413 sent from the printing process includes the name of a process to be processed, a shape to be displayed, a type of operation, and a color in the form of parameters. Examples of the shape parameter may include, for example, a "rectangle" command, a "square" command, a "circle" command, and an "ellipse" command. Examples of the operation parameter may include, for example, a "lighting-on" command, a "blinking" command, and a "lighting-off" command (2414).

An IT administrator can install an additional filter for monitoring print data having a name "AAA" in a filter pipeline of the printer driver 403. The processing for informing a user of the presence of the monitoring filter through the applet 410 is described next.

The process AAA registers itself in the event handler 900. The process AAA sets a character string "—Monitoring AAA filter—" for a comment, a "rectangle" for plotted points, and "blinking" for an operation. Accordingly, a comment 2422 of the process AAA and a plot 2424 of a graph 2323 appear in an extension window 2421 of the applet 410.

The processing performed in the second application example is described below with reference to FIGS. 24A to 24D.

Figure 24A:
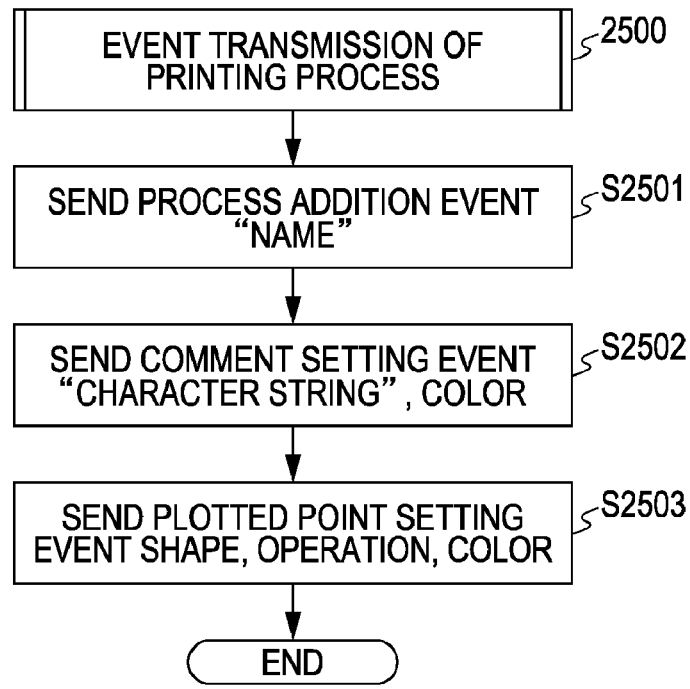
FIGS. 24A to 24D illustrate an embodiment of a flowchart of the second application example of the system.

An embodiment of an event transmission process 2500 of the printing process is described next with reference to FIG. 24A.

In step S2501, the printing process sends a process addition event. In step S2502, the printing process sends a comment setting event. In step S2503, the printing process sends a plotted point setting event.

Figure 24B:
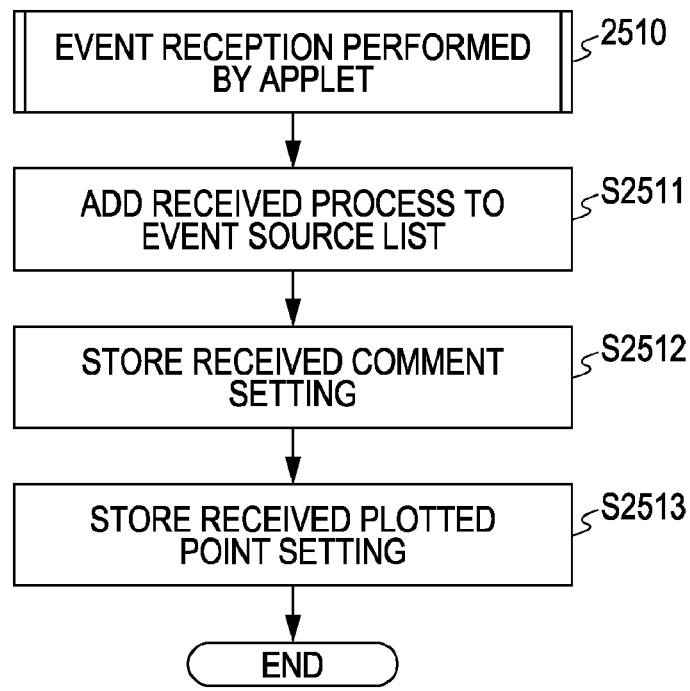

An embodiment of an event reception process 2510 performed by the applet 410 is described next with reference to FIG. 24B.

In step S2511, the applet 410 adds an additional process to an event source list on the basis of the received process addition event. In step S2512, the applet 410 stores the received comment setting. In step S2513, the applet 410 stores the received plot setting.

Figure 24C:
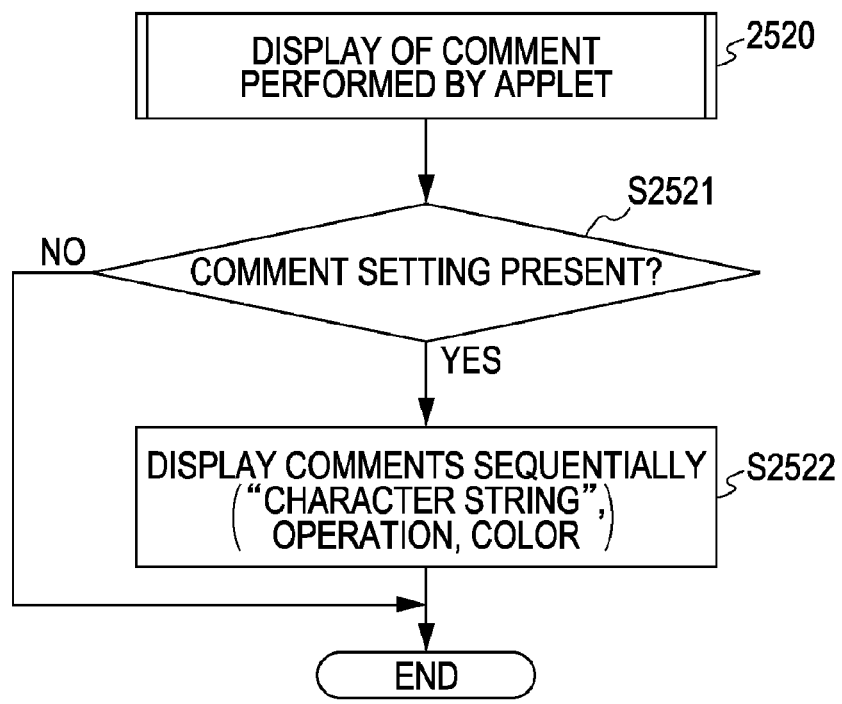

An embodiment of a comment display process 2520 performed by the applet 410 is described next with reference to FIG. 24C.

If a comment setting is present (YES in step S2521), processing advances to step S2522, where the applet 410 sequentially displays the stored comments while setting a parameter.

Figure 24D:
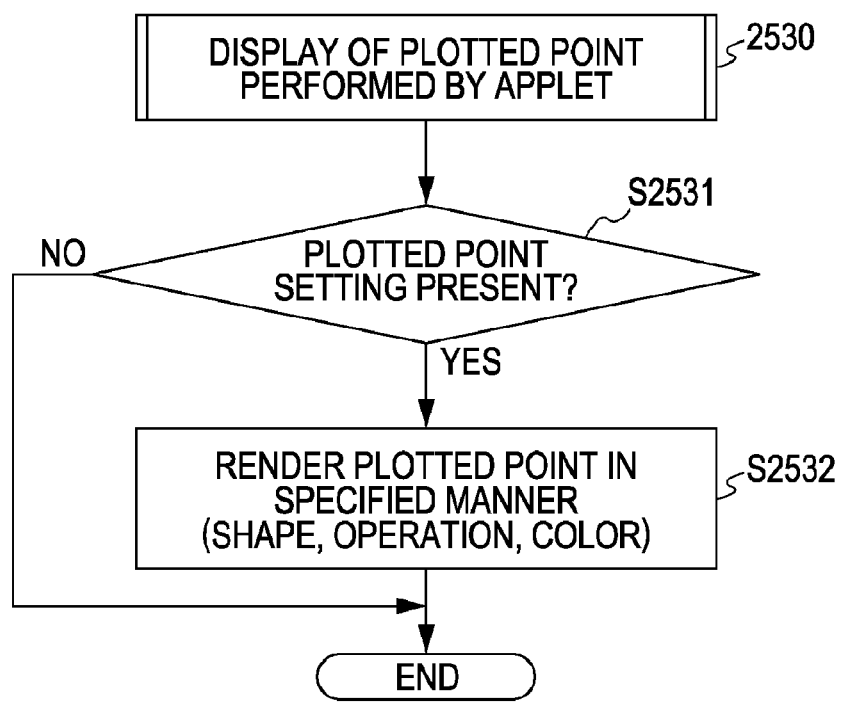

An embodiment of a plot display process 2530 performed by the applet 410 is described next with reference to FIG. 24D.

If a plot setting is present (YES in step S2531), processing proceeds to step S2532, where the applet 410 renders the corresponding stored plotted points using a specified parameter.

It should be noted that the above-described display and control of the printing progress may be applicable to a process for recording and delivering the printing progress to be displayed as information. In addition, the above-described display and control of the printing progress may be similarly applicable to a process for embedding the information in a common document, maintaining the information in the form of a log, and transferring the information.

In one embodiment, aspects of the present invention can be applied to a system constituted by a plurality of devices (e.g., computers, interface units, readers, and printers), or to an apparatus comprising a single device (e.g., a copier, a printer, or a facsimile unit).

In one version, the present invention can also be achieved by causing a computer (a central processing unit (CPU) or a micro-processing unit (MPU)) of the system or apparatus to read out a program code having computer-executable instructions corresponding to the flow charts described in the above-described exemplary embodiments from a storage medium, and execute the computer-executable instructions of the program code.

In such a case, the program code having the computer-executable instructions itself as read from the storage medium may realize aspects and functions of the above-described exemplary embodiments. Accordingly, in one embodiment, aspects of the present invention may relate to the storage medium storing the program code having the computer-executable instructions.

Examples of the storage medium for supplying the program code can include, but are not limited to, a floppy (trade name) disk, a hard disk, an optical disk, a magneto-optical disk, a CD-ROM (compact disk-read only memory), a CD-R (CD recordable), a magnetic tape, a nonvolatile memory card, ROM or the like.

In addition, in one version, the functions of the above-described embodiments can also be achieved by an operating system (OS) running on the computer and executing some of or all of the functions of the above-described embodiments on the basis of computer-executable instructions.

Furthermore, in one embodiment, the functions of the above-described embodiments may be capable of being realized by a process in which, after the program code having the computer-executable program code read from the storage medium has been written into a memory of an add-on expansion board or an add-on expansion unit connected to a computer, a CPU in the add-on expansion board or in the add-on expansion unit may execute some of or all of the functions in the above-described embodiments under the control of the program code.

While the present invention has been described with reference to exemplary embodiments, it is to be understood that the invention is not limited to the particular exemplary embodiments disclosed herein. The scope of the following claims is to be accorded the broadest interpretation so as to encompass all modifications and equivalent structures and functions.

This application claims the benefit of Japanese Application No. 2007-330952 filed Dec. 21, 2007, which is hereby incorporated by reference herein in its entirety.

What is claimed is:

1. An information processing apparatus configured to display information about a progress of print processing of a document which a user has instructed to be printed by using an application, the information processing apparatus comprising:
   a display unit configured to display the progress of print processing using information regarding a document structure and the number of pages of the document;
   an updating unit configured to update the displayed information in accordance with the progress of print processing of the document; and
   a receiving unit configured to receive an event based on the progress of print processing of the document,
   wherein the updating unit updates the displayed information on the basis of the event received by the receiving unit, and
   wherein the document is processed through a plurality of filters in the information processing apparatus, the receiving unit receives page identification information of the document and information indicating that page data indicated by the page identification information has passed through the processing of each of the filters in the form of an event, and the updating unit updates the displayed information on the basis of the event received by the receiving unit, so that pages of the document being subjected to the processing of the filters are identified.

2. The information processing apparatus according to claim 1, further comprising:
   a determining unit configured to determine whether the information regarding the document structure of the document is set for the document;
   wherein, when the determining unit determines that the information regarding the document structure of the document is set for the document, the display unit displays the progress of print processing using the information regarding the document structure of the document and the number of pages of the document, and wherein, when the determining unit determines that the information regarding the document structure of the document is not set for the document, the display unit displays the progress of print processing using the number of pages of the document.

3. The information processing apparatus according to claim 1, wherein the receiving unit receives, from a printer that is connected to the information processing apparatus so as to be communicable with the information processing apparatus and that prints the document, the page identification information regarding the document and information indicating that page data of the document indicated by the page identification information has been output from the printer in the form of an event, and wherein the updating unit updates the displayed information on the basis of the event received by the receiving unit, so that a page of the document output from the printer is identified.

4. The information processing apparatus according to claim 1, wherein an additional filter is capable of being attached to the information processing apparatus, and wherein, when displaying the progress of print processing, the display unit displays a name of the additional filter, and wherein the updating unit updates the displayed information, so that a page of the document being processed by the additional filter is identified.

5. The information processing apparatus according to claim 4, wherein the additional filter is a monitoring filter attached to the information processing apparatus in order to monitor the print processing of the document.

6. The information processing apparatus according to claim 1, wherein the displayed information includes a name of the document which a user has instructed to be printed, and a job name of the document is used for the name of the document.

7. The information processing apparatus according to claim 1, wherein the information regarding the document structure of the document is represented using a tree structure, the displayed information includes a name of the document which a user has instructed to be printed, and a value assigned to a root node of the information regarding the document structure of the document is used for the name of the document.

8. An information processing method for use in an information processing apparatus configured to display information about a progress of print processing of a document which a user has instructed to be printed by using an application, the method comprising:

displaying the progress of print processing using information regarding a document structure and the number of pages of the document;

updating the displayed information in accordance with the progress of print processing of the document, and receiving an event based on the progress of print processing of the document;

wherein the displayed information is updated on the basis of the received event, and wherein the document is processed through a plurality of filters in the information processing apparatus, page identification information of the document and information indicating that page data indicated by the page identification information has passed through the processing of each of the filters are received in the form of an event, and the displayed information is updated on the basis of the received event, so that pages of the document being subjected to the processing of the filters are identified.

9. The information processing method according to claim 8, further comprising:

determining whether the information regarding the document structure of the document is set for the document;

wherein, when it is determined that the information regarding the document structure of the document is set for the document, the progress of print processing is displayed using the information regarding the document structure of the document and the number of pages of the document, and wherein, when it is determined that the information regarding the document structure of the document is not set for the document, the progress of print processing is displayed using the number of pages of the document.

10. The information processing method according to claim 8, wherein, from a printer that is connected to the information processing apparatus so as to be communicable with the information processing apparatus and that prints the document, the page identification information regarding the document and information indicating that page data of the document indicated by the page identification information has been output from the printer are received in the form of an event, and wherein the displayed information is updated on the basis of the received event so that a page of the document output from the printer is identified.

11. The information processing method according to claim 8, wherein an additional filter is capable of being attached to the information processing apparatus, and wherein, when the progress of print processing is displayed, a name of the additional filter is displayed, and wherein the displayed information is updated so that a page of the document being processed by the additional filter is identified.

12. The information processing method according to claim 11, wherein the additional filter is a monitoring filter attached to the information processing apparatus in order to monitor the print processing of the document.

13. The information processing method according to claim 8, wherein the displayed information regarding the progress of print processing includes a name of the document which a user has instructed to be printed, and a job name of the document is used for the name of the document.

14. The information processing method according to claim 8, wherein the information regarding the document structure of the document is represented using a tree structure, the displayed information regarding the progress of print processing includes a name of the document which a user has instructed to be printed, and a value assigned to a root node of the information regarding the document structure of the document is used for the name of the document.

15. A computer-readable storage medium comprising computer-executable instructions for controlling an information processing apparatus, the computer-readable storage medium comprising:

computer-executable instructions for performing the information processing method according to claim 8.

* * * * *